United States Patent
Sung et al.

(10) Patent No.: US 8,368,597 B2
(45) Date of Patent: Feb. 5, 2013

(54) ANTENNA PATTERN FRAME AND METHOD OF MANUFACTURING THE SAME

(75) Inventors: Jae Suk Sung, Gyunggi-Do (KR); Dae Seong Jeon, Gyunggi-Do (KR); Hyun Kil Nam, Gyunggi-Do (KR); Sung Eun Cho, Gyunggi-Do (KR); Tae Sung Kim, Seoul (KR); Chan Gwang An, Gyunggi-Do (KR); Hyun Do Park, Gyunggi-Do (KR); Chang Mok Han, Chungcheongnam-Do (KR); Byung Hwa Lee, Gyunggi-Do (KR); Jung Eun Noh, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 521 days.

(21) Appl. No.: 12/645,992

(22) Filed: Dec. 23, 2009

(65) Prior Publication Data

US 2010/0271283 A1     Oct. 28, 2010

(30) Foreign Application Priority Data

Apr. 23, 2009   (KR) .................. 10-2009-0035636

(51) Int. Cl.
*H01Q 1/38* (2006.01)
(52) U.S. Cl. .................... 343/700 MS; 343/702; 29/600
(58) Field of Classification Search ........... 343/700 MS, 343/702; 29/600
See application file for complete search history.

(56) References Cited

U.S. PATENT DOCUMENTS

| | | | |
|---|---|---|---|
| 6,285,324 B1 | 9/2001 | Korisch et al. | |
| 6,396,444 B1 | 5/2002 | Goward et al. | |
| 6,822,609 B2 * | 11/2004 | Mendolia et al. | ...... 343/700 MS |
| 2003/0045324 A1 * | 3/2003 | Nagumo et al. | ............... 455/550 |
| 2007/0040755 A1 | 2/2007 | Na et al. | |
| 2008/0278401 A1 | 11/2008 | Yu | |
| 2009/0015507 A1 | 1/2009 | Hong et al. | |

(Continued)

FOREIGN PATENT DOCUMENTS

| DE | 102006033192 A1 | 3/2007 |
|---|---|---|
| DE | 102008031934 A1 | 1/2009 |

(Continued)

OTHER PUBLICATIONS

JP Office Action 2009-295743 dated Sep. 13, 2011.

(Continued)

*Primary Examiner* — Tan Ho
(74) *Attorney, Agent, or Firm* — Lowe Hauptman Ham & Berner LLP

(57) ABSTRACT

An antenna pattern frame according to an aspect of the invention may include: a radiator having an antenna pattern portion transmitting and receiving a signal and a connection terminal portion allowing the signal to be transmitted to and received from a circuit board of an electronic device; a connection portion partially forming the radiator and connecting the antenna pattern portion and the connection terminal portion to be arranged in different planes; a radiator frame manufactured by injection molding on the radiator so that the antenna pattern portion may be provided on one side of the radiator frame and the connection terminal portion may be provided on the other side thereof, while the antenna pattern portion is embedded in the electronic device case; and a contact surface extension provided on the radiator to prevent the radiator from being loosened from the radiator frame during injection molding of the radiator frame, and increasing a contact area with respect to the radiator frame.

18 Claims, 19 Drawing Sheets

U.S. PATENT DOCUMENTS

| | | |
|---|---|---|
| 2009/0295649 A1 | 12/2009 | An et al. |
| 2010/0220028 A1 | 9/2010 | Cho et al. |
| 2010/0234082 A1 | 9/2010 | Hong et al. |
| 2010/0271265 A1 | 10/2010 | Sung et al. |
| 2010/0271270 A1 | 10/2010 | Sung et al. |
| 2010/0271272 A1 | 10/2010 | Sung et al. |

FOREIGN PATENT DOCUMENTS

| | | |
|---|---|---|
| DE | 102008052987 A1 | 12/2009 |
| DE | 102009046678 A1 | 9/2010 |
| DE | 102009046679 A1 | 10/2010 |
| DE | 102009046936 A1 | 11/2010 |
| DE | 102009055359 A1 | 11/2010 |
| DE | 102009055361 A1 | 11/2010 |
| JP | 57062635 | 4/1982 |
| JP | 10247817 A | 9/1998 |
| JP | 2001148603 A | 5/2001 |
| JP | 2003078323 A | 3/2003 |
| JP | 2003-158415 A | 5/2003 |
| JP | 2005064945 A | 3/2005 |
| JP | 2008236014 A | 10/2008 |
| JP | 2009027019 A | 2/2009 |
| KR | 1020020050133 A | 6/2002 |
| KR | 200356488 Y1 | 7/2004 |
| KR | 1020070044140 A | 4/2007 |
| KR | 1020070060297 A | 6/2007 |
| KR | 1020070109332 A | 11/2007 |
| KR | 100794252 B1 | 1/2008 |
| KR | 100892305 B1 | 4/2009 |

OTHER PUBLICATIONS

Office Action of DE 102009055289.8 dated Oct. 13, 2011.
Japanese Office Action for Application No. 2009-295743 mailed Apr. 24, 2012.
A Chinese Office Action, dated Jun. 13, 2012 issued in CN Application No. 200910265265.3
Japanese Office Action for Application No. 2009-295743 mailed Oct. 2, 2012.

* cited by examiner

ANTENNA PATTERN FRAME AND METHOD OF MANUFACTURING THE SAME

CROSS-REFERENCE TO RELATED APPLICATIONS

This application claims the priority of Korean Patent Application No. 10-2009-0035636 filed on Apr. 23, 2009, in the Korean Intellectual Property Office, the disclosure of which is incorporated herein by reference.

BACKGROUND OF THE INVENTION

1. Field of the Invention

The present invention relates to an antenna pattern frame having an antenna radiator formed on a surface thereof and a method of manufacturing the same, and more particularly, to an antenna pattern frame having, on a surface thereof, an antenna radiator to be embedded in an electronic device case, and a method of manufacturing the same.

2. Description of the Related Art

Mobile communications terminals such as cellular phones, personal digital assistants (PDAs) and laptop computers, which support wireless communications, are indispensable devices in modern society. Functions including CDMA, wireless LANs, GSM and DMB have been added to these mobile communications terminals. One of the most important components that enable these functions is associated with antennas.

Antennas being used in these mobile communications terminals have advanced from external antennas, such as rod antennas or helical antennas, to internal antennas that are disposed inside terminals.

External antennas are susceptible to damage by external shock, while internal antennas increase the volume of terminals.

In order to solve these problems, research has been undertaken to manufacture antennas that are formed integrally with mobile communications terminals.

In order that antennas are formed integrally with terminals, a method of bonding flexible antennas to terminal bodies using adhesives is used. Recently, a method of forming antenna films by molding has been proposed.

However, when flexible antennas are bonded by simply using adhesives, the reliability of these antennas is reduced as the adhesiveness decreases. Besides, this also causes harm to the appearance of the terminals, lessening emotional quality for consumers.

In addition, when antenna films are used, product stability can be ensured. However, a process of bonding an antenna to a film is difficult to perform and manufacturing costs are also increased.

SUMMARY OF THE INVENTION

An aspect of the present invention provides an antenna pattern frame and a method of manufacturing the same that can prevent the loosening of an antenna radiator from the surface of the antenna pattern frame by fixing the antenna radiator in close contact with the frame surface.

According to an aspect of the present invention, there is provided an antenna pattern frame including: a radiator having an antenna pattern portion transmitting and receiving a signal and a connection terminal portion allowing the signal to be transmitted to and received from a circuit board of an electronic device; a connection portion partially forming the radiator and connecting the antenna pattern portion and the connection terminal portion to be arranged in different planes; a radiator frame manufactured by injection molding on the radiator so that the antenna pattern portion may be provided on one side of the radiator frame and the connection terminal portion may be provided on the other side thereof, while the antenna pattern portion is embedded in the electronic device case; and a contact surface extension provided on the radiator to prevent the radiator from being loosened from the radiator frame during injection molding of the radiator frame, and increasing a contact area with respect to the radiator frame.

The contact surface extension may extend from an edge of the radiator, be bent, and be embedded into the radiator frame.

The contact surface extension may be provided by forming a hole in a surface of the radiator.

The contact surface extension may be embossed into a surface of the radiator.

The contact surface extension may be provided by bending a corner of the antenna pattern portion downward and be embedded into the radiator frame.

The connection portion may be provided by bending the radiator, and the connection terminal portion is then provided by bending the connection portion.

The connection terminal portion may be supported in contact with a radiator support portion protruding from the other side opposite to the one side of the radiator frame.

The connection portion may be provided through a radiator support portion protruding from the other side opposite to the one side of the radiator frame.

A guide pin hole may be provided in the radiator so that a guide pin of a mold is inserted into the guide pin hole during injection molding to thereby prevent a movement of the radiator on the radiator frame.

A contact pin hole may be provided in the radiator so that a contact pin of a mold is inserted into the contact pin hole during injection molding to thereby prevent a movement of the radiator on the radiator frame.

The antenna pattern portion may have a curvature, and the radiator frame may have a curved portion so that the antenna pattern portion having the curvature may be provided on a surface thereof.

According to another aspect of the present invention, there is provided a method of manufacturing an antenna pattern frame, the method including: forming a contact surface extension on a radiator to increase a contact area with respect to a resin material during injection molding, the radiator having an antenna pattern portion transmitting and receiving a signal, a connection terminal portion making contact with a circuit board of an electronic device, and a connection portion connecting the antenna pattern portion and the connection terminal portion to be arranged in different planes; arranging the radiator having the contact surface extension formed thereon in a space inside an upper or lower mold; and injecting a resin material in the space so that the space inside the upper or low mold forms a radiator frame allowing the antenna pattern portion to be embedded in the electronic device case.

A guide pin, a contact pin or a guide pin and a contact pin, formed in the upper or lower mold, may be inserted into or make contact with a guide pin hole, a contact pin hole or a guide pin hole and a contact pin hole formed in the radiator when the upper and lower molds are joined.

The contact surface extension may extend from an edge of the radiator, be bent, and be embedded into the radiator frame by injection molding.

The contact surface extension may be provided by forming a hole in a surface of the radiator, through which the resin material being injected fills the space.

The contact surface extension may be embossed into a surface of the radiator to increase the contact area with respect to the resin material being injected.

The contact surface extension may be provided by bending a corner of the antenna pattern portion and be embedded into the radiator frame manufactured by injecting molding using the resin material.

The injection molding may be performed such that the antenna pattern portion is arranged in contact with one surface of one of the upper and lower molds, and the connection terminal portion is arranged in contact with one surface of the other mold.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
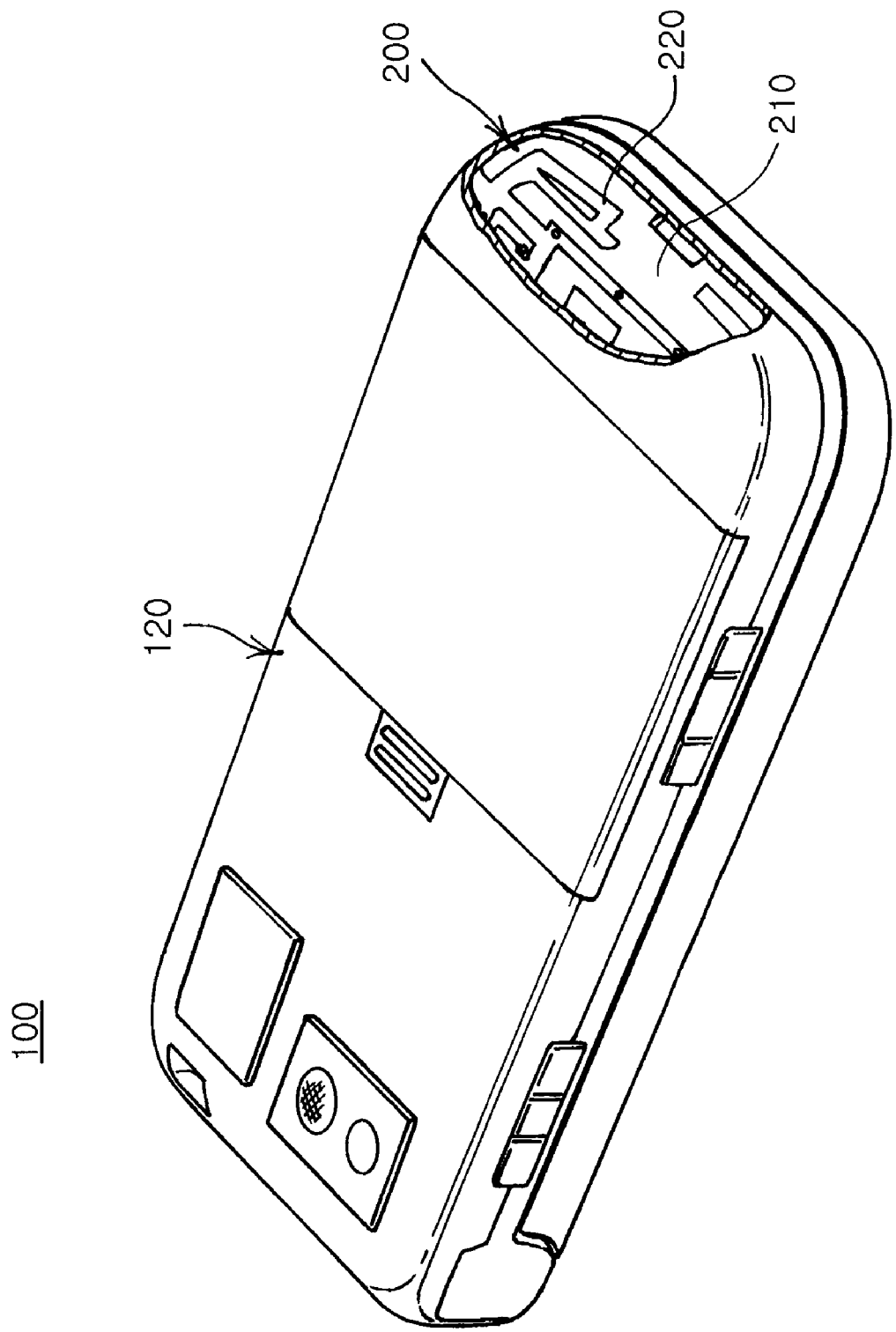
FIG. 1 is a schematic perspective view, with a cut-out portion, a case of a mobile communications terminal, which is an electronic device, according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, the shapes and dimensions may be exaggerated for clarity, and the same reference numerals will be used throughout to designate the same or like components.

Figure 2:
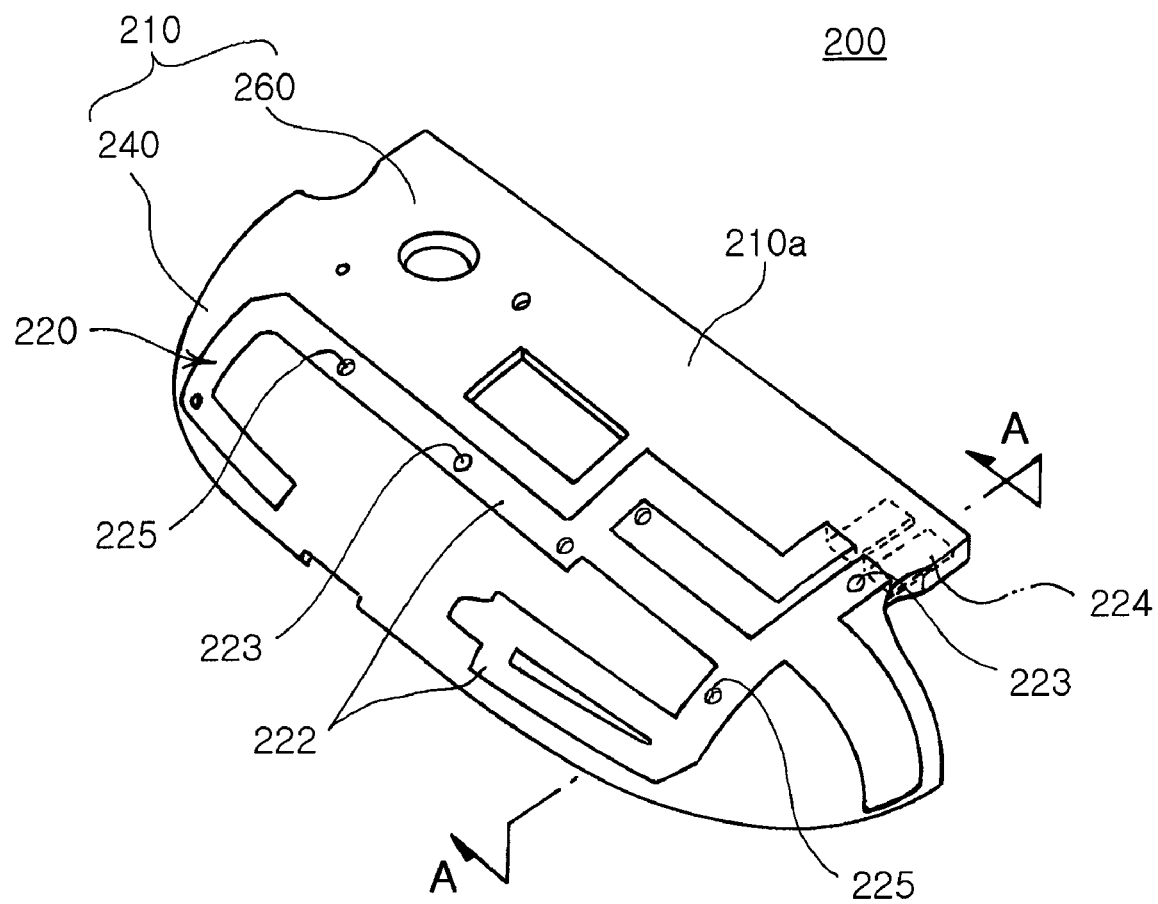
FIG. 2 is a schematic perspective view illustrating an antenna pattern frame according to a first embodiment of the present invention.
Figure 3:
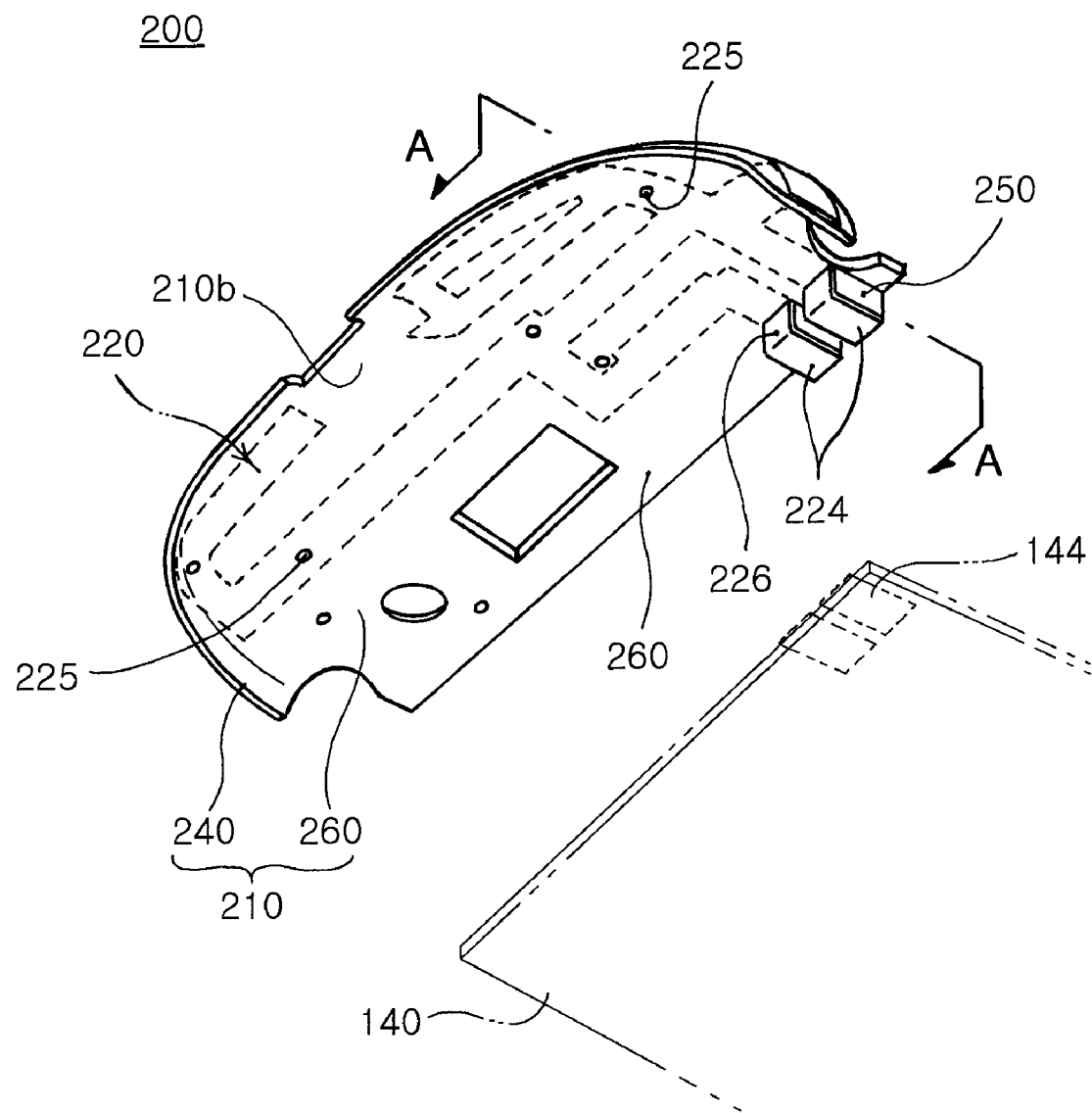
FIG. 3 is a rear perspective view illustrating the antenna pattern frame of FIG. 2.
Figure 4:
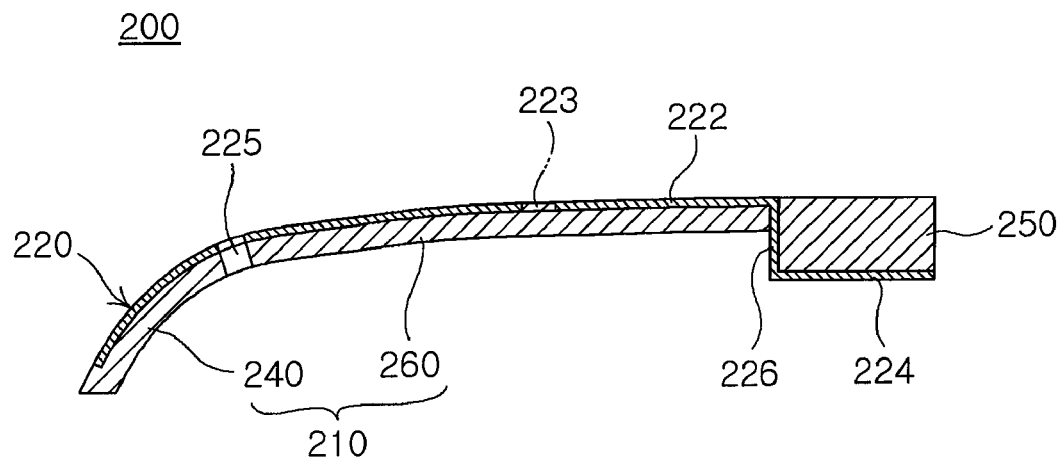
FIG. 4 is a cross-sectional view taken along the line A-A of FIGS. 2 and 3.

FIG. 1 is a schematic perspective view illustrating, with a cut-out portion, a case of a mobile communications terminal that is an electronic device according to an exemplary embodiment of the invention. FIG. 2 is a schematic perspective view illustrating an antenna pattern frame according to a first embodiment of the invention. FIG. 3 is a rear perspective view illustrating the antenna pattern frame of FIG. 2. FIG. 4 is a cross-sectional view taken along the line A-A of FIGS. 2 and 3.

Referring to FIGS. 1 through 4, a radiator 220 having an antenna pattern formed thereon according to this embodiment is embedded in a case 120 of a mobile communications terminal 100. In order that the radiator 220 having the antenna pattern thereon is embedded in the case 120, an antenna pattern frame 200 needs to be provided so that the radiator 220 having the antenna pattern thereon is formed on a radiator frame 210.

The antenna pattern frame 200, provided to form the antenna pattern inside the electronic device case according to this embodiment, may include the radiator 220 having an antenna pattern portion 222 and connection terminal portions 224, and the radiator frame 210.

The radiator 220 may be formed of a conductive material, such as aluminum or copper. Further, the radiator 220 may receive external signals and transmit the received external signals to a signal processor of the electronic device such as the mobile communications terminal 100. Further, the radiator 220 includes the antenna pattern portion 222 which is a meander line antenna pattern.

The connection terminal portions 224 transmit the received external signals to the electronic device. The connection terminal portions 224 may be formed by bending, forming or drawing a portion of the radiator 220. Alternatively, the connection terminal portions 224 may be manufactured separately from the radiator 220 and be then connected to the radiator 220 (see FIG. 7).

The radiator frame 210 may have a three-dimensional structure consisting of a straight portion 260 having a flat profile and a curved portion 240 with a curvature. The radiator 220 may have flexibility such that the radiator 220 can be disposed along the curved portion 240 of the radiator frame 210.

The radiator frame 210 is produced by injection molding. While the antenna pattern portion 222 may be formed on one side 210a of the radiator frame 210, the connection terminal portions 224 may be formed on the other side 210b opposite to the one side 210a.

The radiator 220, which is embedded in the electronic device case 120, has the antenna pattern portion 222 receiving external signals and the connection terminal portions 224 transmitting the received external signals to the electronic device that may be arranged in the different planes.

The one side 210a of the radiator frame 210, on which the antenna pattern portion 222 is formed, is bonded to the inside of the electronic device case 120, so that the antenna pattern can be embedded in the electronic device case 120.

Alternatively, the antenna pattern may be embedded in the electronic device case 120 by placing the antenna pattern frame 200 in a mold and performing insert molding.

Therefore, the antenna pattern frame 200 serves as a first injection molded part so that the radiator 220 having the antenna pattern portion 222 thereon is placed within the electronic device case 120.

The radiator 220 and the radiator frame 210 may have the same boundary, which increases the fluidity of materials, such as resin, during a second injection molding process in which the antenna pattern frame 200 is placed within the mold after the first injection molding process.

Guide pin holes 225 may be formed in the radiator 220. Guide pins 328 (see FIG. 9) of a mold 300 are inserted into the guide pin holes 225 during molding to thereby prevent the movement of the radiator 220 on the radiator frame 210.

Contact pin holes 223 may be formed in the radiator 220 so that contact pins 326 (see FIG. 9) of the mold 300 are inserted into the contact pin holes 223 during injection molding, thereby preventing the movement of the radiator 220 on the radiator frame 210.

The contact pins 326 and the guide pins 328 may be formed on the radiator 220. After injection molding is completed, portions of the radiator frame 210 located under the contact pins 326 are filled, while holes are formed in portions of the radiator frame 210 located under the guide pins 328.

The contact pins 326 to be inserted into the contact pin holes 223, formed in the radiator 220, prevent the horizontal movement of the radiator 220 in the mold 300 during the first injection molding process. Furthermore, the guide pins 328 to be inserted into the guide pin holes 225, formed in the radiator 220, prevent the vertical movement of the radiator 220 in the mold 300 during the first injection molding process.

Various embodiments of the antenna pattern frame 200 configured as described above will now be described in detail.

[Antenna Pattern Frame According to First Embodiment]

FIGS. 2 through 4 are views illustrating an antenna pattern frame according to a first embodiment of the invention.

The radiator 220 of the antenna pattern frame 200 according to the first embodiment may be bent to form the connection terminal portions 224, the antenna pattern portion 222, and connection portions 226 connected therebetween.

The connection portions 226 may connect the antenna pattern portion 222 and the connection terminal portions 224 to be arranged in the different planes. The connection terminal portions 224 that are not embedded in the electronic device case may be exposed on the other side 210b of the antenna pattern frame 200.

That is, the radiator 220 is bent on the basis of the connection portions 226 to form the antenna pattern portion 222 and the connection terminal portions 224, so that the radiator 220 can be realized to have a three-dimensional curved surface.

In order to support the radiator 220 having the three-dimensional curved surface, radiator support portions 250 may protrude from the other side 210b of the radiator frame 210.

The radiator support portions 250 can firmly support the connection portions 226 and the connection terminal portions 224 that are exposed on the other side 210b.

[Antenna Pattern Frame According to Second Embodiment]

Figure 5:
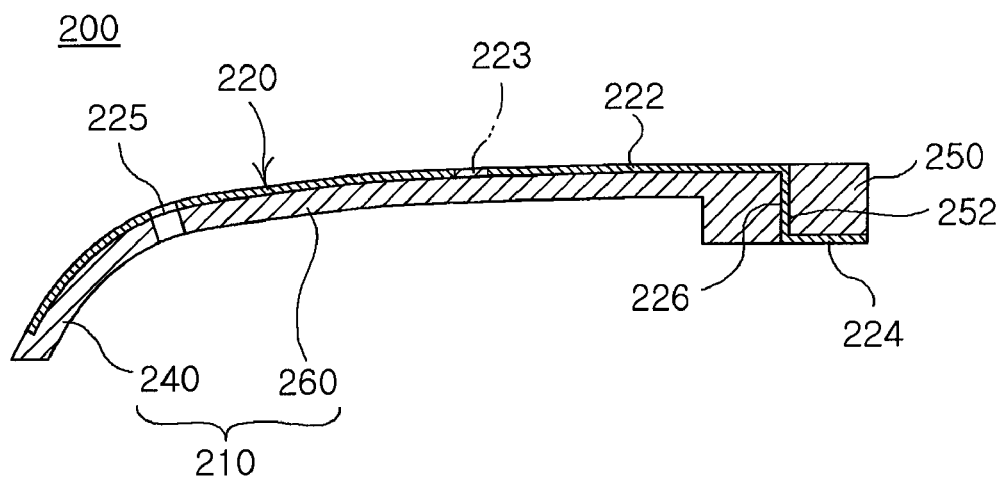
FIG. 5 is a schematic sectional view illustrating an antenna pattern frame according to a second embodiment of the present invention.

FIG. 5 is a schematic sectional view illustrating an antenna pattern frame according to a second embodiment of the invention.

Referring to FIG. 5, similarly to the first embodiment, described with reference to FIGS. 2 through 4, the radiator 220 of the antenna pattern frame 200 according to the second embodiment may be bent to form the connection terminal portions 224 and the antenna pattern portion 222, and the connection portions 226 connected therebetween.

However, the connection portions 226 according to the second embodiment may be formed through the radiator support portions 250 that protrude from the other side of the radiator frame 210.

[Antenna Pattern Frame According to Third Embodiment]

Figure 6:
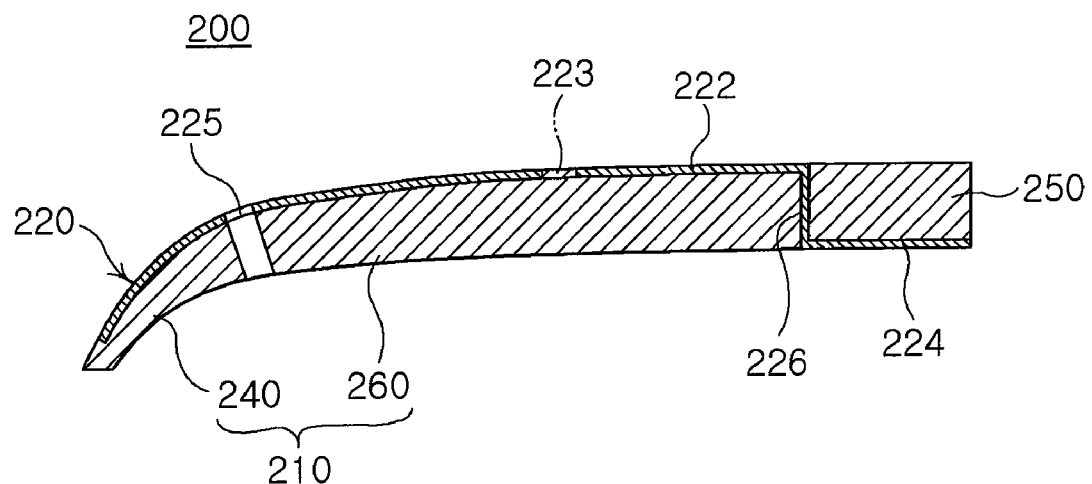
FIG. 6 is a schematic sectional view illustrating an antenna pattern frame according to a third embodiment of the present invention.

FIG. 6 is a view illustrating an antenna pattern frame according to a third embodiment of the invention.

Referring to FIG. 6, similarly to the above-described first and second embodiments, the radiator 220 of the antenna pattern frame 200 may be bent to form the connection terminal portions 224 and the antenna pattern portion 222, and the connection portions 226 connected therebetween.

The radiator frame 210 according to the third embodiment does not have the radiator support portions 250 that protrude from the other side 210a of the antenna pattern frame 200. The bottom of the radiator support portions 250 is at the same level as that of the radiator frame 210. Further, the connection portions 226 according to the third embodiment may be formed through the radiator frame 210 or the radiator support portions 250.

[Antenna Pattern Frame According to Fourth Embodiment]

Figure 7:
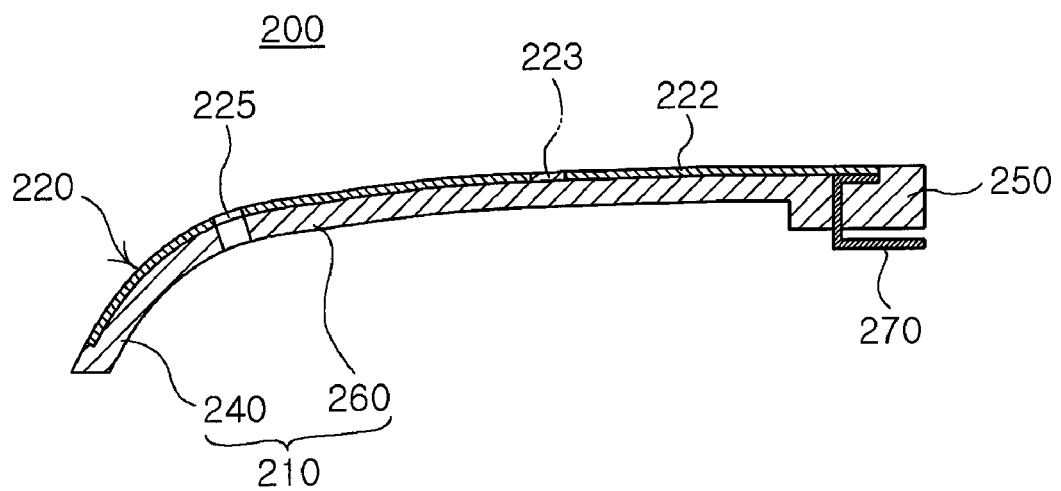
FIG. 7 is a schematic sectional view illustrating an antenna pattern frame according to a fourth embodiment of the present invention.

FIG. 7 is a view illustrating an antenna pattern frame according to a fourth embodiment of the invention.

Referring to FIG. 7, the antenna pattern frame 200 according to the fourth embodiment may include a connection terminal 270 that is separated from the antenna pattern portion 222.

The connection terminal 270 may be an elastic body that connects the antenna pattern portion 222 and a circuit board 140 to each other.

In particular, the connection terminal 270 may be a C-clip or a pogo-pin that allows for an electrical connection between the antenna pattern portion 222 and the circuit board 140. A hole may be formed in the radiator frame 210 so that the connection terminal 270 can be inserted into the hole.

Hereinafter, a method and mold for manufacturing the antenna pattern frame 200 according to the above-described various embodiments will now be described in detail.

Figure 8:
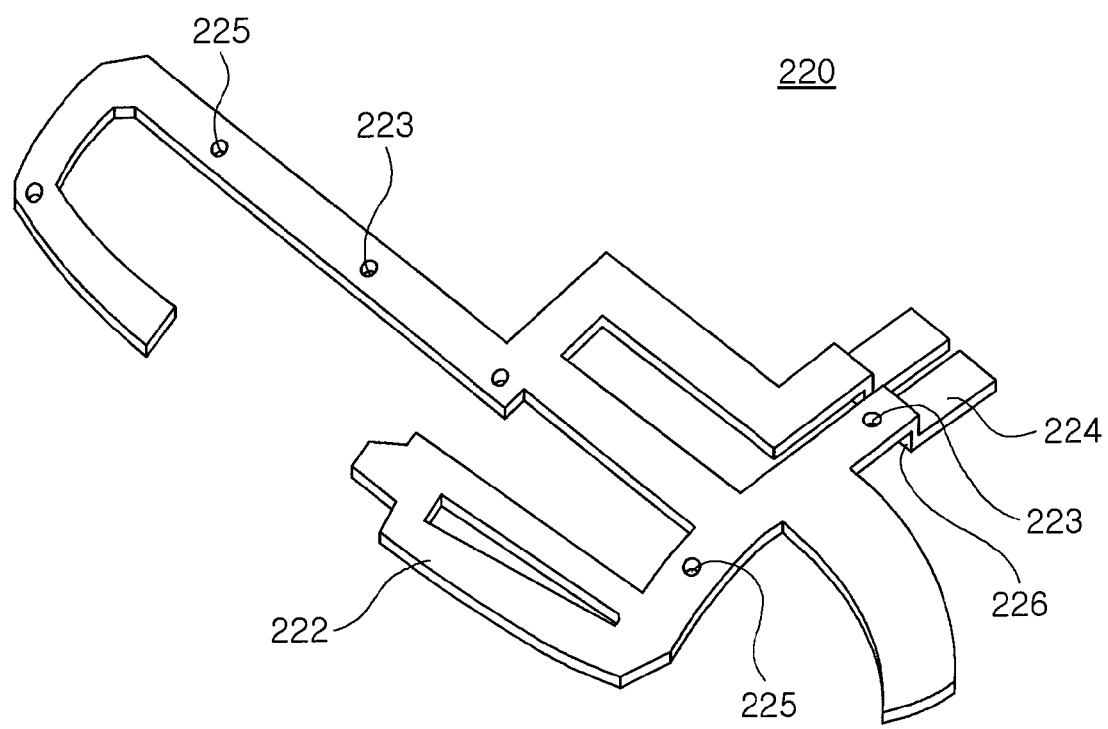
FIG. 8 is a schematic perspective view illustrating a radiator that is used to manufacture an antenna pattern frame according to an exemplary embodiment of the present invention.
Figure 9:
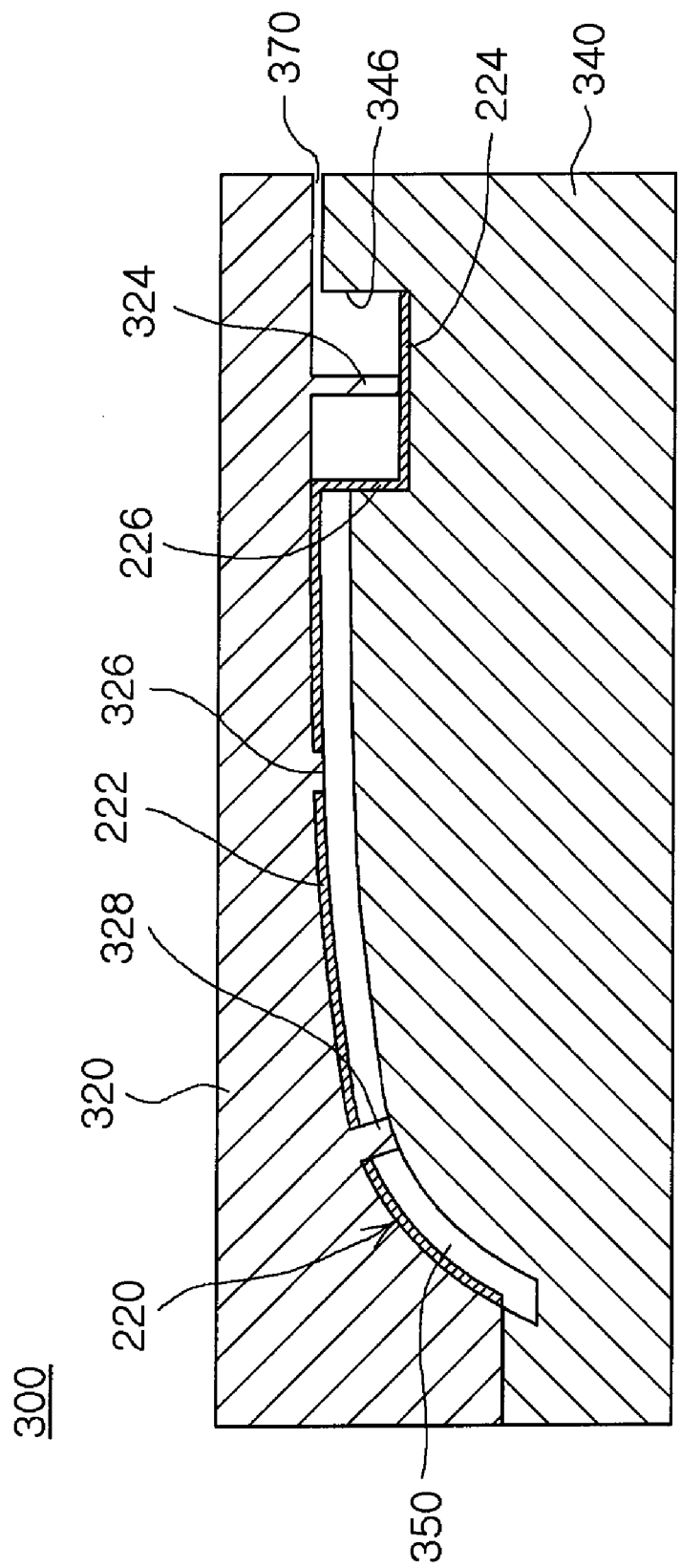
FIG. 9 is a schematic sectional view illustrating a first embodiment of a mold for manufacturing an antenna pattern frame in order to illustrate a method of manufacturing an antenna pattern frame according to an exemplary embodiment of the present invention.
Figure 10:
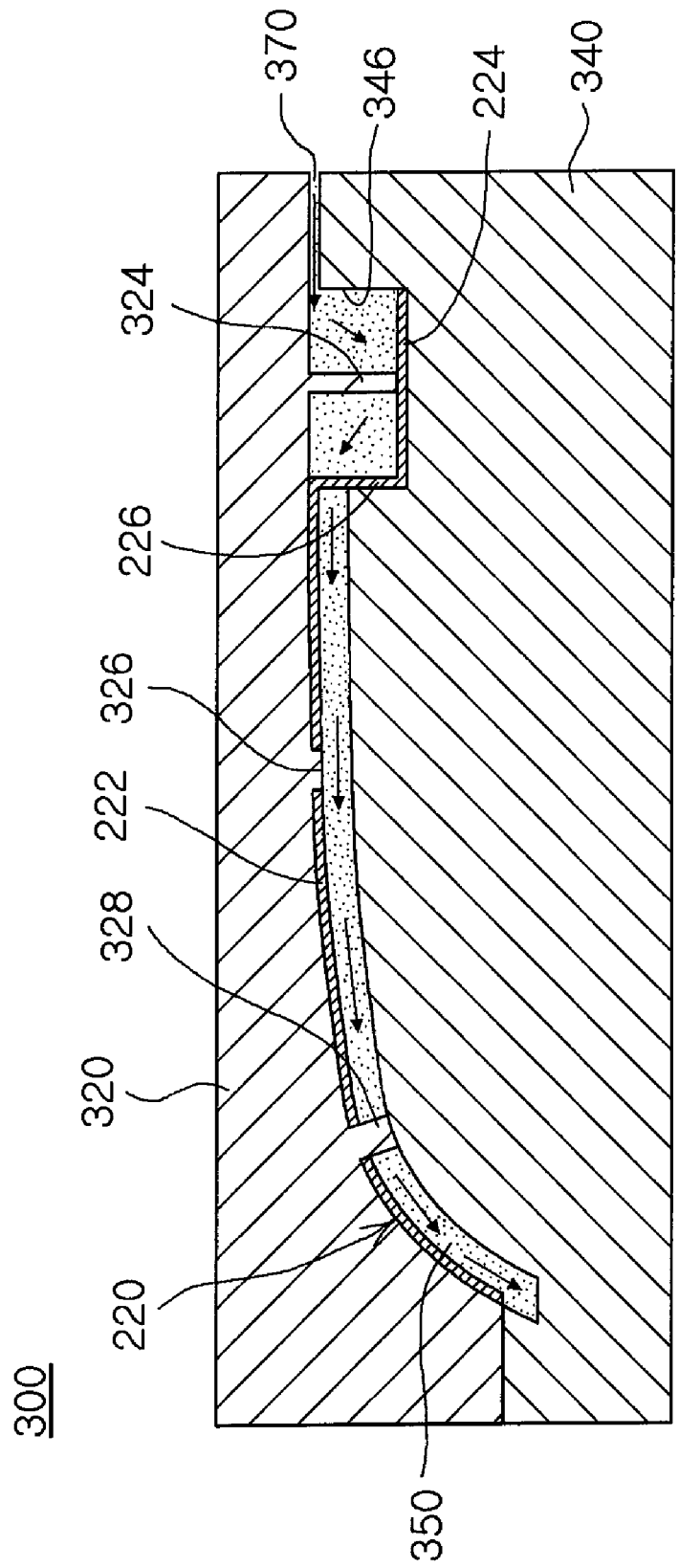
FIG. 10 is a schematic view illustrating how a resin material is injected into the mold of FIG. 9.

FIG. 8 is a schematic perspective view illustrating a radiator that is used to manufacture an antenna pattern frame according to an exemplary embodiment of the invention. FIG. 9 is a schematic sectional view illustrating a first embodiment of a mold for manufacturing an antenna pattern frame in order to illustrate a method of manufacturing an antenna pattern frame according to an exemplary embodiment of the invention. FIG. 10 is a schematic view illustrating how a resin material is injected into the mold of in FIG. 9.

Hereinafter, a method of manufacturing the antenna pattern frame 200 according to an exemplary embodiment of the invention will be described with reference to FIGS. 8 through 10.

First, as shown in FIG. 8, the radiator 220 has the antenna pattern portion 222 and the connection terminal portions 224 that are arranged in the different planes. The antenna pattern portion 222 receives external signals. The connection terminal portions 224 are in contact with the circuit board of the electronic device to thereby transmit the received external signals to the electronic device.

Both the guide pin holes 225 and the contact pin holes 223 may be formed in the radiator 220.

The radiator 220 may have a three-dimensional structure. Specifically, the radiator 220 is bent to form the antenna pattern portion 222 and the connection terminal portions 224, and the connection terminal portions 226 connected therebetween.

After the radiator 220 is provided, the radiator 220 is placed in an inner space 350 of the mold 300.

The inner space 350 is created when an upper mold 320 and a lower mold 340 are joined. A recess, formed in the upper mold 320 or the lower mold 340, becomes the inner space 350 when the upper mold 320 and the lower mold 340 are joined.

When the upper mold 320 and the lower mold 340 are joined, the guide pins 328, the contact pins 326, or the guide pins 328 and the contact pins 326, formed in the upper mold 320 or the lower mold 340, are inserted into or make contact with the guide pin holes 225, the contact pin holes 223, or the guide pin holes 225 and the contact pin holes 223, formed in the antenna pattern portion 222, so that the radiator 220 can be fixed in the inner space 350.

A resin material is injected into the inner space 350 to form the radiator frame 210, so that the antenna pattern portion 222 is embedded in the electronic device case 120.

Here, the inner space 350 of the upper or lower mold 320 or 340 is curved so that the radiator frame 210 has a curved portion 240.

The resin material is injected so that the bottom of the radiator 220 is at the same level as that of the radiator frame 210. Therefore, when the radiator frame 210 is put in the mold for injection molding in order to manufacture the electronic device case 120 in which the antenna pattern is embedded, the flowability of the resin can be improved.

[Mold for Manufacturing Antenna Pattern Frame According to First Embodiment]

Referring to FIGS. 9 and 10, the mold 300 for manufacturing the antenna pattern frame 200 will be described in detail.

The mold 300 for manufacturing the electronic device case 120 having the antenna pattern portion 222 embedded therein according to an exemplary embodiment of the invention may include the upper and lower molds 320 and 340 and the resin material injection portion 370.

The radiator 220 may be received between the upper and lower molds 320 and 340 while the antenna pattern portion 222 receiving an external signal and the connection terminal portions 224 in contact with the circuit board 140 of the electronic device are arranged in the different planes.

The resin material injection portion 370 is a passage through which a resin material flows. The resin material injection portion may be formed in the upper mold 320, the lower mold 340 or the upper and lower molds 320 and 340. When the upper and lower molds 320 and 340 are joined, the resin material is injected into the inner space 350 between the upper and lower molds 320 and 340 so that the resin material filling the inner space 350 forms the radiator frame 210 that allows the antenna pattern portion 222 to be placed within the electronic device case 120.

The guide pins 328, the contact pins 326 or the guide pins 328 and the contact pins 326, formed on the radiator 220, may be inserted into or make contact with the guide pin holes 225, the contact pin holes 223 or the guide pin holes 225 and the contact pin holes 223, formed in any one of the upper mold 320, the lower mold 340 or the upper and lower molds 320 and 340.

The inner space 350 between the upper and lower molds 320 and 340 may have a space allowing the radiator frame 210 to have the curved portion 240.

Furthermore, the inner space 350 of the upper and lower molds 320 and 340 may receive the connection terminal portions 224 and have radiator support portion forming recesses 346 to thereby form the radiator support portions 250 that support the connection terminal portions 224.

Further, compression pins 324 may be provided on the upper mold 320, the lower mold 340 or the upper and lower molds 320 and 340. The compression pins 324 compress the connection terminal portions 224 arranged in the radiator support portion forming recesses 346 so that the connection terminal portions 224 make contact with the radiator support portion forming recesses 346.

The compression pins 324 may prevent the resin material from flowing under the connection terminal portions 224. If the connection terminal portions 224 are partially covered with the injection molding material, this may cause an unstable electrical connection. The compression pins 324 can prevent this unstable electrical connection.

[Mold for Manufacturing Antenna Pattern Frame According to Second Embodiment]

Figure 11:
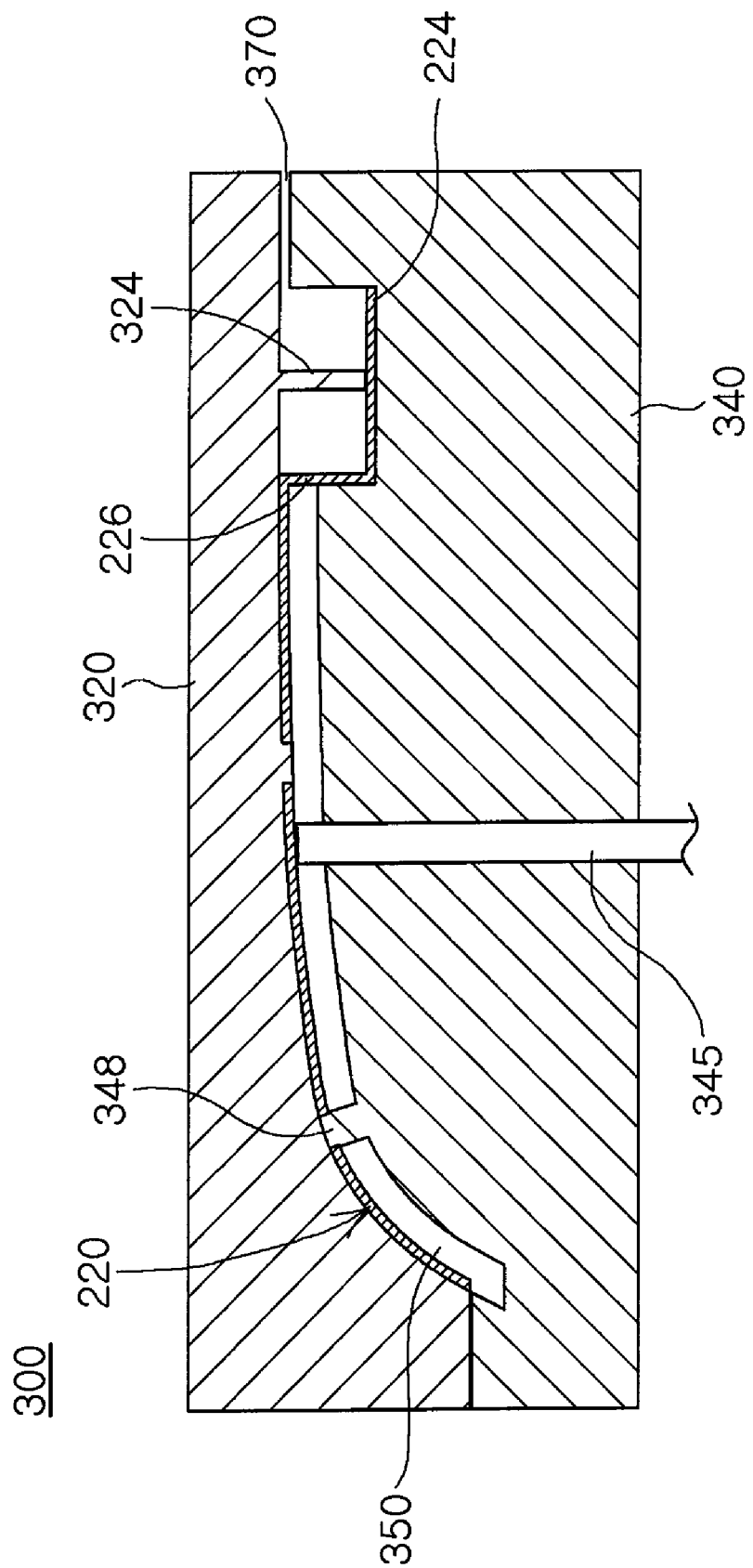
FIG. 11 is a schematic sectional view illustrating a second embodiment of a mold for manufacturing an antenna pattern frame in order to illustrate a method of manufacturing an antenna pattern frame according to an exemplary embodiment of the present invention.
Figure 12:
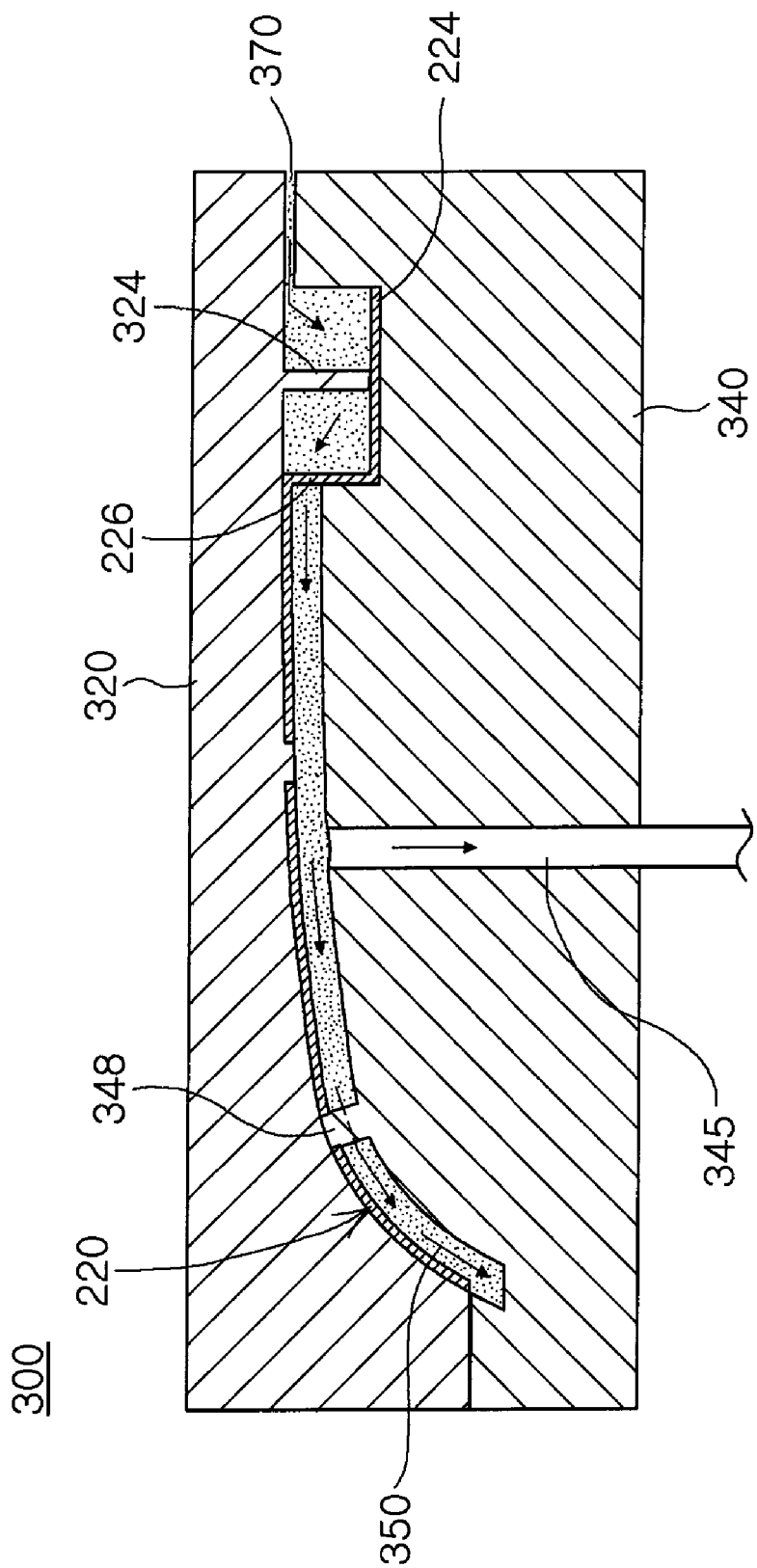
FIG. 12 is a schematic view illustrating how a resin material is injected into the mold of FIG. 11.

FIG. 11 is a schematic sectional view illustrating a second embodiment of a mold for manufacturing an antenna pattern frame to illustrate a method of manufacturing an antenna pattern frame according to an exemplary embodiment of the invention. FIG. 12 is a schematic view illustrating how a resin material is injected into the mold of FIG. 11.

With reference to FIGS. 11 and 12, the antenna pattern frame mold 300 according to the second embodiment is substantially the same as the mold for manufacturing an antenna pattern frame according to the first embodiment except as described herein below.

According to the second embodiment, at least one of the guide pins or contact pins that prevent the movement of the radiator may be inserted into the mold 300 due to the flow of the resin material into the mold.

These guide pins or contact pins may be defined as flow pins 345. The flow pins 345, arranged in the inner space 350 of the mold 300, support the radiator 220 before a resin material is injected and may move from the inner space 350 toward the mold 300 as the injection molding material is injected.

The use of the flow pins 345 can minimize pin marks unlike other pins fixed to the mold 300.

[Mold for Manufacturing Antenna Pattern Frame According to Third Embodiment]

Figure 13:
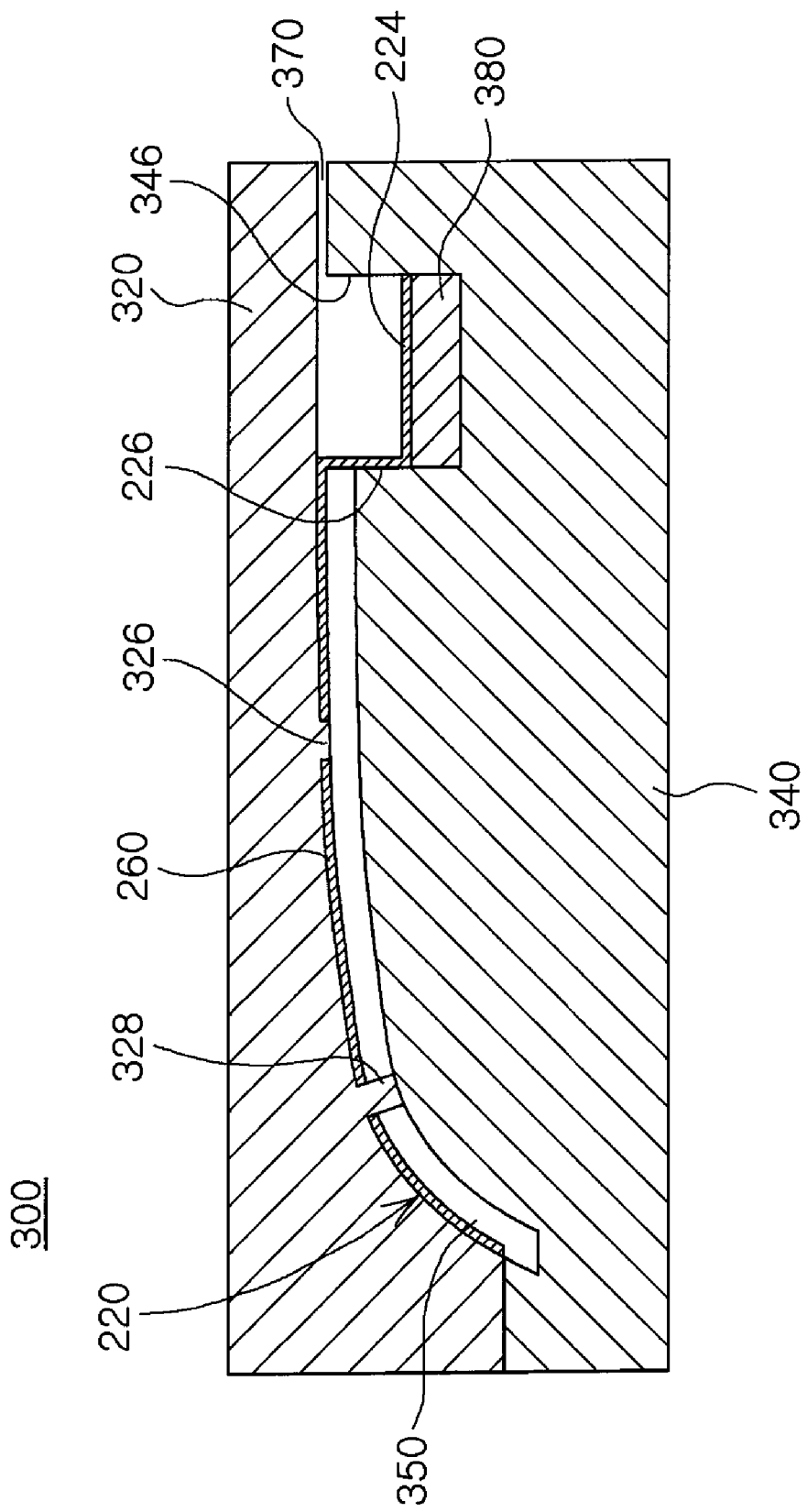
FIG. 13 is a schematic sectional view illustrating a third embodiment of a mold for manufacturing an antenna pattern frame in order to illustrate a method of manufacturing an antenna pattern frame according to an exemplary embodiment of the present invention.
Figure 14:
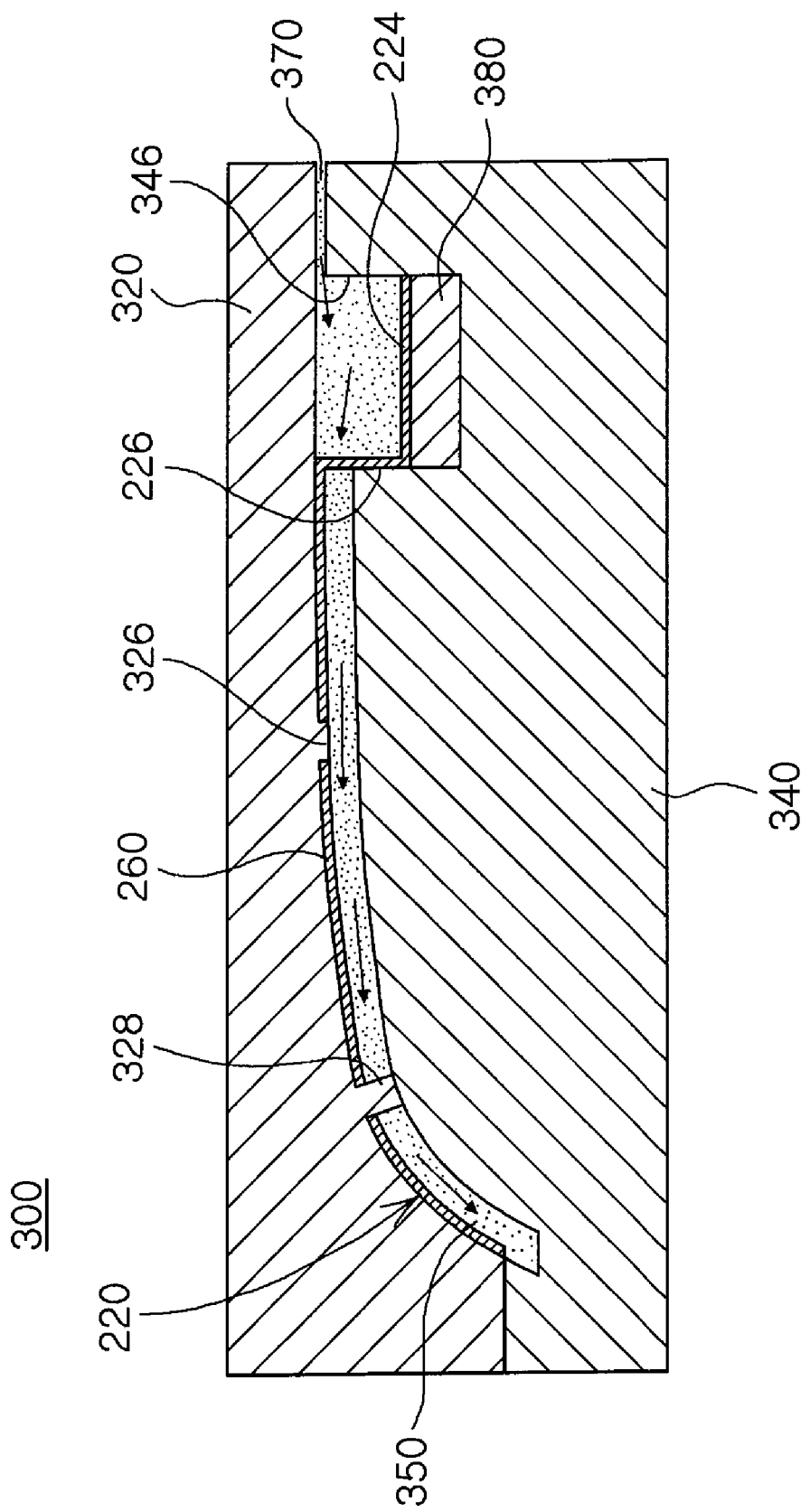
FIG. 14 is a schematic view illustrating how a resin material is injected into the mold of FIG. 13.

FIG. 13 is a schematic sectional view illustrating a third embodiment of a mold for manufacturing an antenna pattern frame to illustrate a method of manufacturing an antenna pattern frame according to an exemplary embodiment of the invention. FIG. 14 is a schematic view illustrating how a resin material is injected into the mold of FIG. 13.

Referring to FIGS. 13 and 14, like the second embodiment, the antenna pattern frame mold 300 according to the third embodiment is substantially the same as the antenna pattern frame mold according to the first embodiment except as described herein below.

According to the third embodiment, magnets 380 may be formed in the radiator support portion forming recesses 346 in which the connection terminal portions 224 are mounted.

Similarly to the compression pins 324, the magnets 380 can prevent the resin material from flowing under the connection terminal portions 224 and prevent an unstable electrical connection caused when the connection terminal portions 244 are partially covered with the injection molding material.

[Antenna Pattern Frame for Preventing Loosening of Radiator and Method of Manufacturing the Same]

Hereinafter, an antenna pattern frame including a radiator frame having an antenna pattern portion firmly fixed thereto, and a method of manufacturing an antenna pattern frame preventing loosening by firmly fixing the antenna pattern portion to the radiator frame will be described.

FIGS. 15A through 15D are schematic perspective views illustrating the shape of an antenna radiator that is used to perform a method of fixing a radiator having an antenna pattern portion formed thereon according to an exemplary embodiment to an antenna pattern frame.

With reference to FIGS. 15A through 15D, various embodiments of a radiator are described in which the radiator 220 having contact surface extensions 227 is fixed to the antenna pattern frame 200.

As for the antenna pattern frame 200 to which the radiator 220, shown in FIGS. 15A through 15D is applied, the radiator 220 having the contact surface extensions 227 formed thereon may be replaced with the radiator 220 of the antenna pattern frame 200, shown in FIGS. 2 through 7.

That is, the antenna pattern frame 200, shown in FIGS. 15A through 15D, may include the radiator 220, the radiator frame 210 and the contact surface extensions 227.

As for the radiator 220 and the radiator frame 210 of FIGS. 15A through 15D, the description of the radiator 220 and the radiator frame 210 with reference to FIGS. 2 through 4 may be repeated.

However, the radiator 220 having the contact surface extensions 227 prevents the loosening of the radiator 220 from the radiator frame 210 when injection molding is performed to manufacture the radiator frame 210.

When a resin material is fed into the mold in which the radiator 220 is placed for injection molding, the contact surface extensions 227 can increase the contact area with the resin material, so that the radiator 220 can be firmly fixed to the radiator frame 210.

Figure 15A:
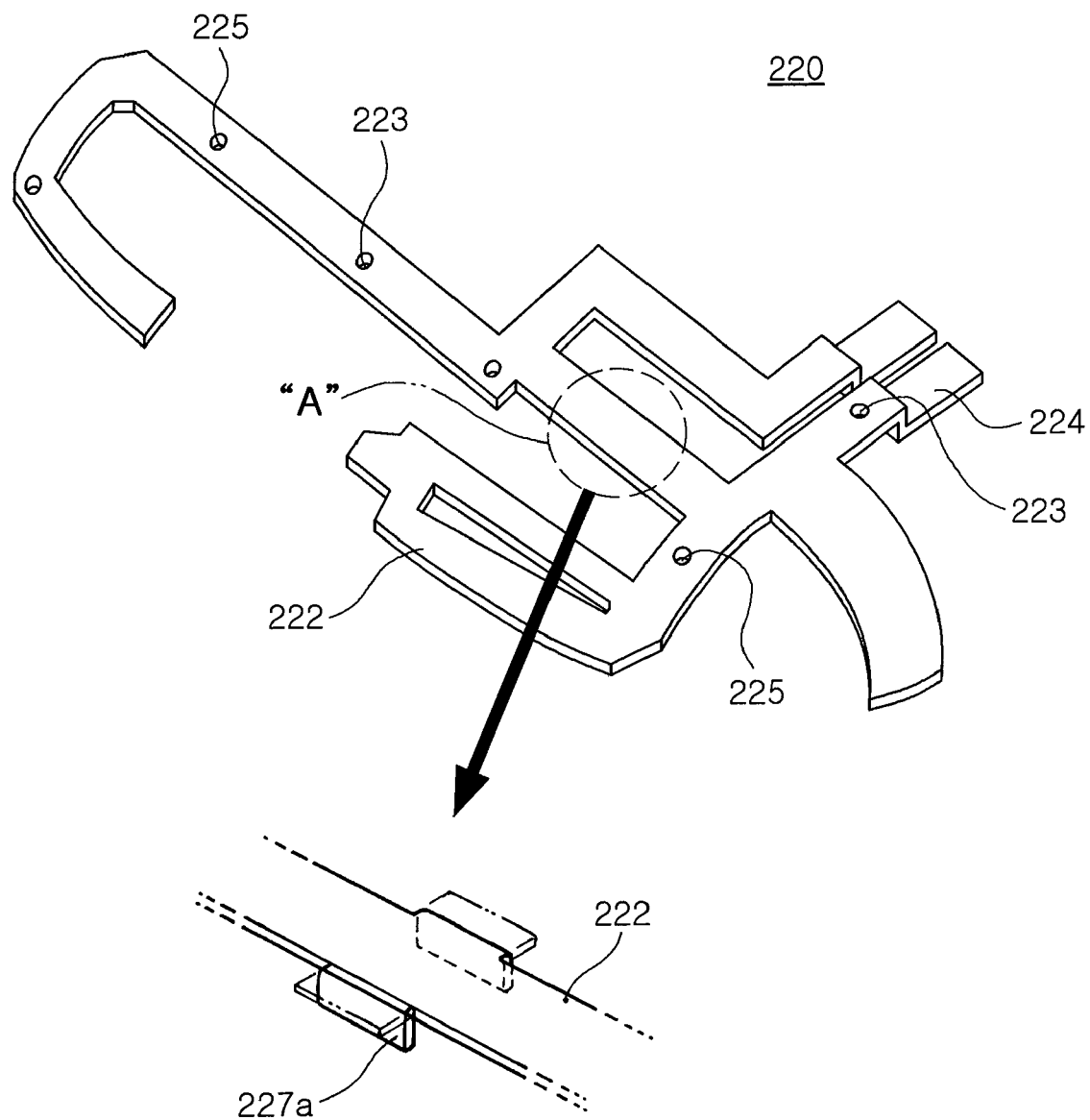
FIGS. 15A through 15D are schematic perspective views illustrating the shape of an antenna radiator that is used to fix a radiator having an antenna pattern to an antenna pattern frame according to an exemplary embodiment of the present invention.

As shown in FIG. 15A, the contact surface extensions 227 may be blades 227a that extend from the edges of the radiator 220, are bent, and are inserted into the radiator frame 210.

Figure 15B:
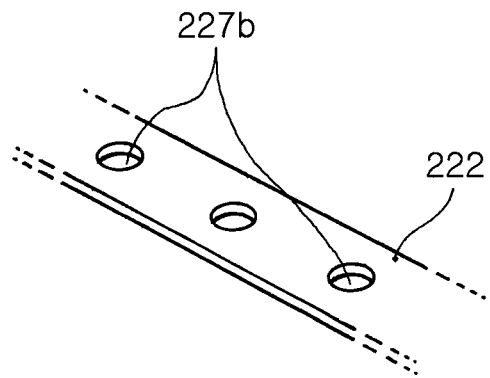

Furthermore, as shown in FIG. 15B, the contact surface extensions 227 may be holes 227b that are formed in the radiator 220. An injection molding material flows through the holes 227b to thereby increase the contact surface and fix the radiator 220 in an accurate position.

Figure 15C:
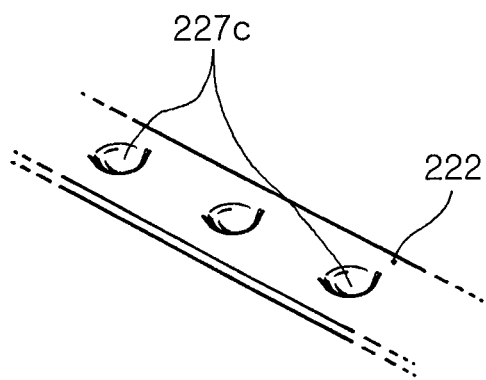

As shown in FIG. 15C, the contact surface extensions 227 may be embossed into the radiator 220 to thereby increase the contact area between the radiator 220 and the injection molding material and determine the accurate position.

Figure 15D:
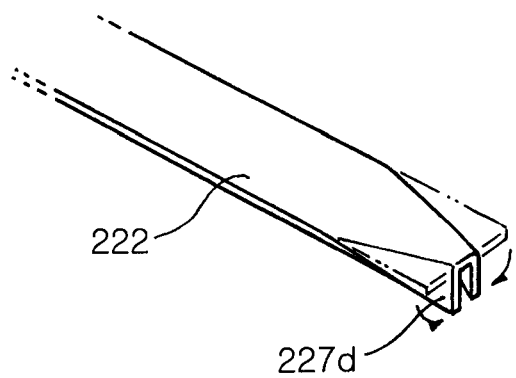

As shown in FIG. 15D, the contact surface extension 227 may be formed by bending the edges of the end of the antenna pattern portion 222 of the radiator 220 downward, and the bent contact extension 227 may be inserted into the radiator frame 210.

The antenna pattern frame 200 according to an exemplary embodiment of the invention that prevents the loosening of the radiator 220 can be applied to the antenna pattern frame as described with reference to FIGS. 2 through 7.

As for the method of manufacturing an antenna pattern frame that can prevent loosening by firmly fixing the antenna pattern to the radiator frame 210, the description of the injection molding methods with reference to FIGS. 8 through 14 may be repeated except that the radiator 220 having the contact surface extensions 227 formed to increase the contact area with the molding injection material is put into the mold 30 during injection molding.

[Electronic Device Case Having Antenna Pattern Radiator Embedded Therein, Method and Mold for Manufacturing the Same, and Mobile Communications Terminal]

Figure 16:
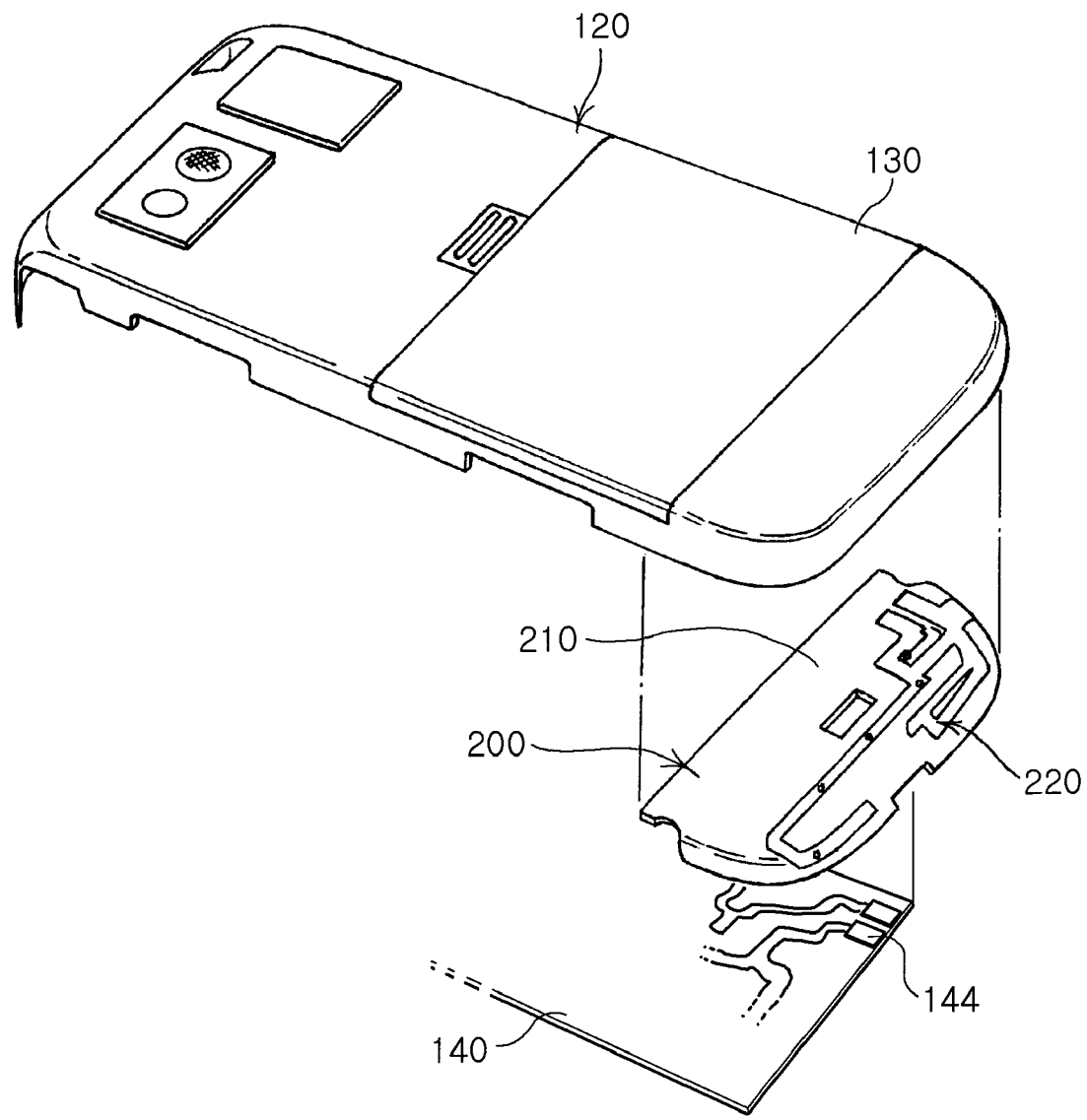
FIG. 16 is an exploded perspective view illustrating a case of a mobile communications terminal that is an electronic device having an antenna pattern radiator is embedded therein according to an exemplary embodiment of the present invention.

FIG. 16 is an exploded perspective view illustrating a case of a mobile communications terminal that is an electronic device having an antenna pattern radiator embedded therein according to an exemplary embodiment of the invention.

Referring to FIG. 16, the electronic device case 120 having the antenna pattern radiator 220 embedded therein according to this embodiment includes the radiator 220, the radiator frame 210 and a case frame 130.

The descriptions of the embodiments, shown in FIGS. 2 through 7, will substitute for a description of the radiator 220 and the radiator frame 210.

The case frame 130 covers one side of the radiator frame 210 having the antenna pattern portion 222 formed thereon, so that the antenna pattern portion 222 is embedded between the radiator frame 210 and the case frame 130.

The radiator frame 210 and the case frame 130 are formed integrally with each other. As viewed from bottom of the electronic device case 120, the antenna pattern portion 222 may not been seen but the connection terminal portions 224 may be seen.

The radiator frame 210, the case frame 130, or the radiator frame 210 and the case frame 130 may be manufactured using injection molding. Particularly, the radiator frame 210 and the case frame 130 are manufactured as different injection molded parts, the radiator frame 210 having the radiator 220 formed thereon is bonded to the case frame 130.

The case frame 130 may be formed by using injection molding on the radiator frame 210, thereby performing double injection molding. That is, the radiator frame 210 is put into the mold, and insert injection molding is performed, so that the radiator frame 210 and the case frame 130 can be formed integrally with each other.

When put into a mold 500 for manufacturing the electronic device case, guide pins or contact pins (not shown), formed on the mold 500, may be inserted into the guide pinholes 225 or the contact pin holes 223, formed in the radiator frame 210, thereby preventing the movement of the antenna pattern frame 200 inside the mold 500.

Hereinafter, a method of manufacturing an electronic device case will be described in detail with reference to FIGS. 16 through 19.

According to the method of manufacturing an electronic device case according to an exemplary embodiment of the invention, the radiator 220 is provided in which the antenna pattern portion 222 receiving an external signal and the connection terminal portions 224 making contact with the connection terminals 144 of the circuit board 140 of the electronic device are arranged in the different planes.

The radiator 220 is placed in the inner space 350 of the upper mold 300 or the lower mold 350 to manufacture the radiator frame 210, and a resin material is fed into the upper and lower molds, thereby manufacturing the radiator frame 210 having the radiator 220 formed on one side of the radiator frame 210.

Furthermore, in order that the radiator 220 is embedded between the radiator frame 210 and the case frame 130, the radiator frame 210 and the case frame 130 are formed integrally with each other to manufacture the electronic device case 120 in which the antenna is embedded.

Figure 17:
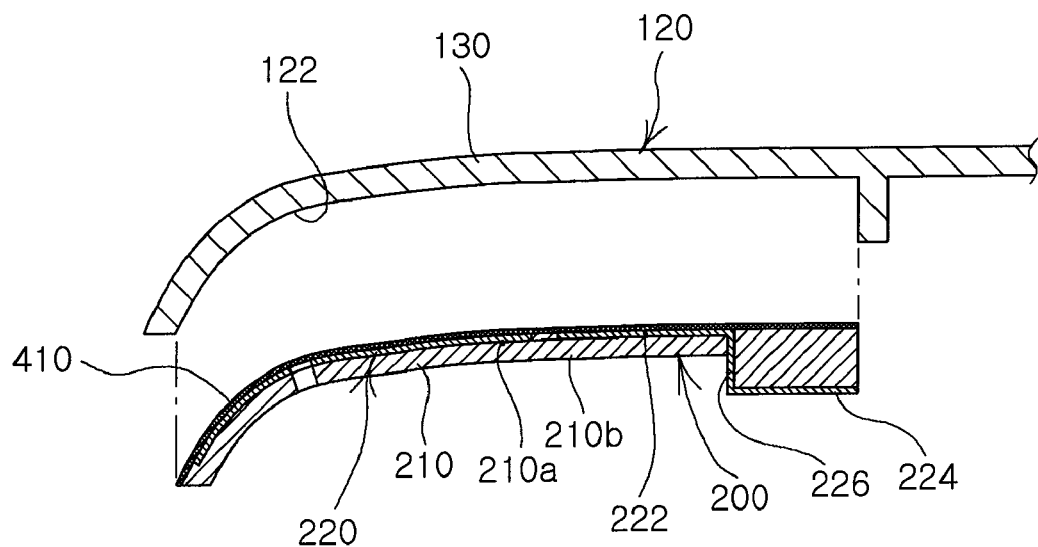
FIG. 17 is a schematic view illustrating a first embodiment of a method of manufacturing an electronic device case having an antenna pattern radiator embedded therein according to an exemplary embodiment of the present invention.

FIG. 17 is a schematic view illustrating a first embodiment of a method of manufacturing an electronic device case having an antenna pattern radiator embedded therein according an exemplary embodiment of the invention.

Referring to FIG. 17, the case frame 130 is a separate injection molded part that includes a radiator receiving recess 122 having a shape corresponding to that of the radiator frame 210. By bonding the radiator frame 210 to the radiator receiving recess 122, the electronic device case 120 having the antenna pattern radiator embedded therein can be manufactured.

An adhesive layer 410 is formed on the surface of the radiator 220 of the antenna pattern frame 200.

Figure 18:
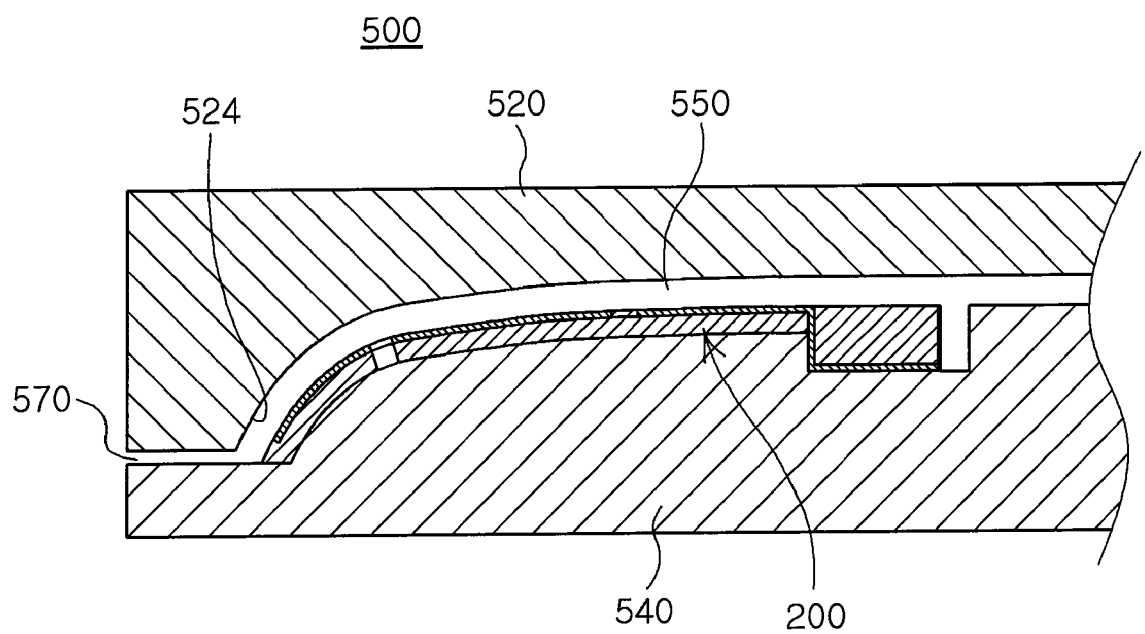
FIG. 18 is a schematic view illustrating a mold for manufacturing an electronic device case that is used to perform a second embodiment of a method of manufacturing an electronic device case having an antenna pattern radiator embedded therein according to an exemplary embodiment of the present invention.
Figure 19:
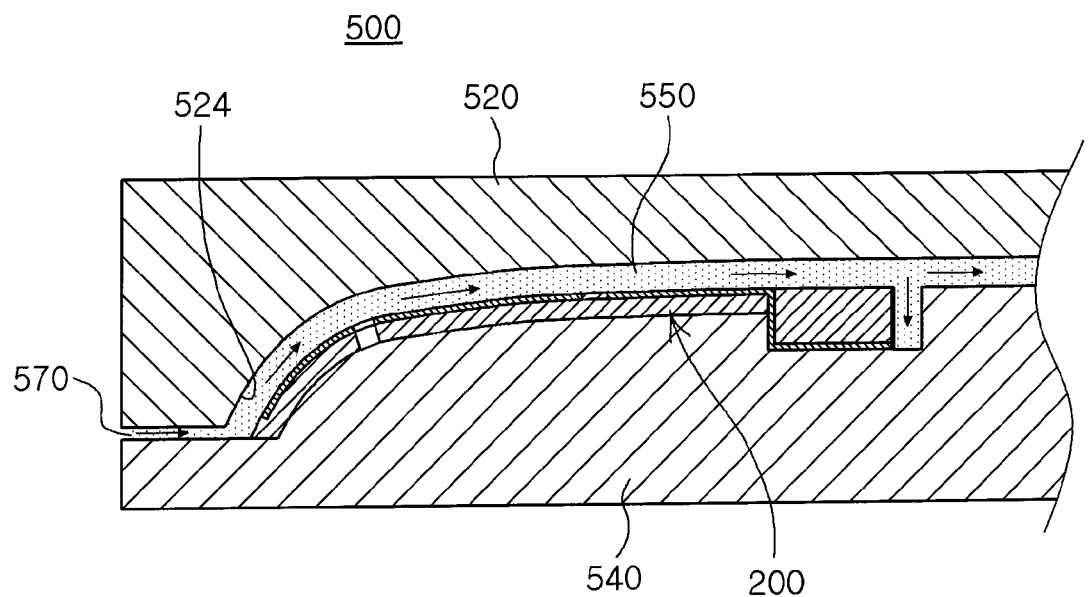
FIG. 19 is a schematic view illustrating how a resin material is injected into the mold of FIG. 18.

FIG. 18 is a schematic view illustrating a mold for manufacturing an electronic device case that is used to perform a second embodiment of a method of manufacturing an electronic device case having an antenna pattern radiator embedded therein according to an exemplary embodiment of the invention. FIG. 19 is a schematic view illustrating how a resin material is injected into the mold of FIG. 18.

Referring to FIGS. 18 and 19, the electronic device case 120 having the antenna pattern radiator 220 embedded therein is manufactured in such a way that the radiator frame 210 is arranged in the mold 500 for manufacturing an electronic device case that has the inner space 550 having a shape corresponding to the case frame, and the resin material is fed into the mold 550, thereby forming radiator frame 210 integrally with the electronic device case 120.

That is, the radiator frame 210 and the case frame 130 may be formed integrally with each other.

Here, injection molding for manufacturing the antenna pattern frame 200 is referred to as a first injection molding process, and injection molding for manufacturing the electronic device case 120 is referred to as a second injection molding process. Like the first injection molding process, the movement of the antenna pattern frame 200 inside the mold 500 can be prevented during the second injection molding process.

Furthermore, the inner space 550 of the mold 500 may include a curve generation portion 524 that allows the electronic device case 120 to be curved.

The mold of the electronic device case for manufacturing the electronic device case 120 having the antenna pattern embedded therein during the second injection molding process may include the upper or lower mold 520 or 540 and a resin material injection portion 570. The upper or lower mold 520 and 540 receives the radiator frame 210 including the radiator 220 having the antenna pattern portion 222 receiving an external signal and the connection terminal portions 224 making contact with the circuit board of the electronic device while the antenna pattern portion 222 and the connection terminal portions 224 are formed in the different planes. The resin material injection portion 570 is formed in the upper mold 520, the lower mold 540, or the upper and lower molds 520 and 540. A resin material flows through the resin material injection portion 570 into the inner space 550 created when the upper and lower molds 520 and 540 are joined, so that the resin material filling the inner space 550 forms the electronic device case 120.

Like the radiator 220, guide pin holes or contact pin holes are formed in the radiator frame 210. The guide pins or the contact pins, formed in the mold 500, may be inserted into these guide pin holes or contact pin holes, so that the movement of the radiator frame 210 inside the mold 500 can be prevented.

The electronic device case having the antenna pattern embedded therein can be applied to the mobile communications terminal 100.

That is, the mobile communications terminal 100, that is, an electronic device having an antenna pattern embedded therein according to an exemplary embodiment of the invention may include the radiator frame 210, the case frame 130 and the circuit board 140.

As for the radiator frame 210 and the case frame 130, all of the above-described embodiments and the manufacturing methods thereof can be applied.

Thus, the above description will substitute for a detailed description of the mobile communications terminal 100.

[Electronic Device to which Antenna Pattern Frame Having a Ground Portion is Applied]

Figure 20:
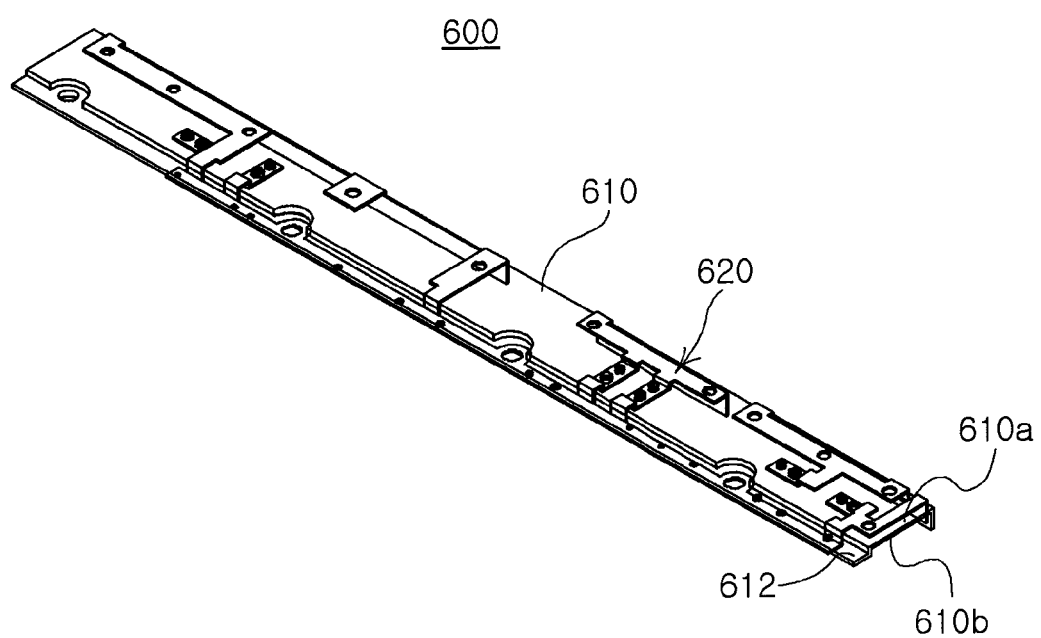
FIG. 20 is a schematic perspective view illustrating an antenna pattern radiator having a ground portion according to another exemplary embodiment of the present invention.
Figure 21:
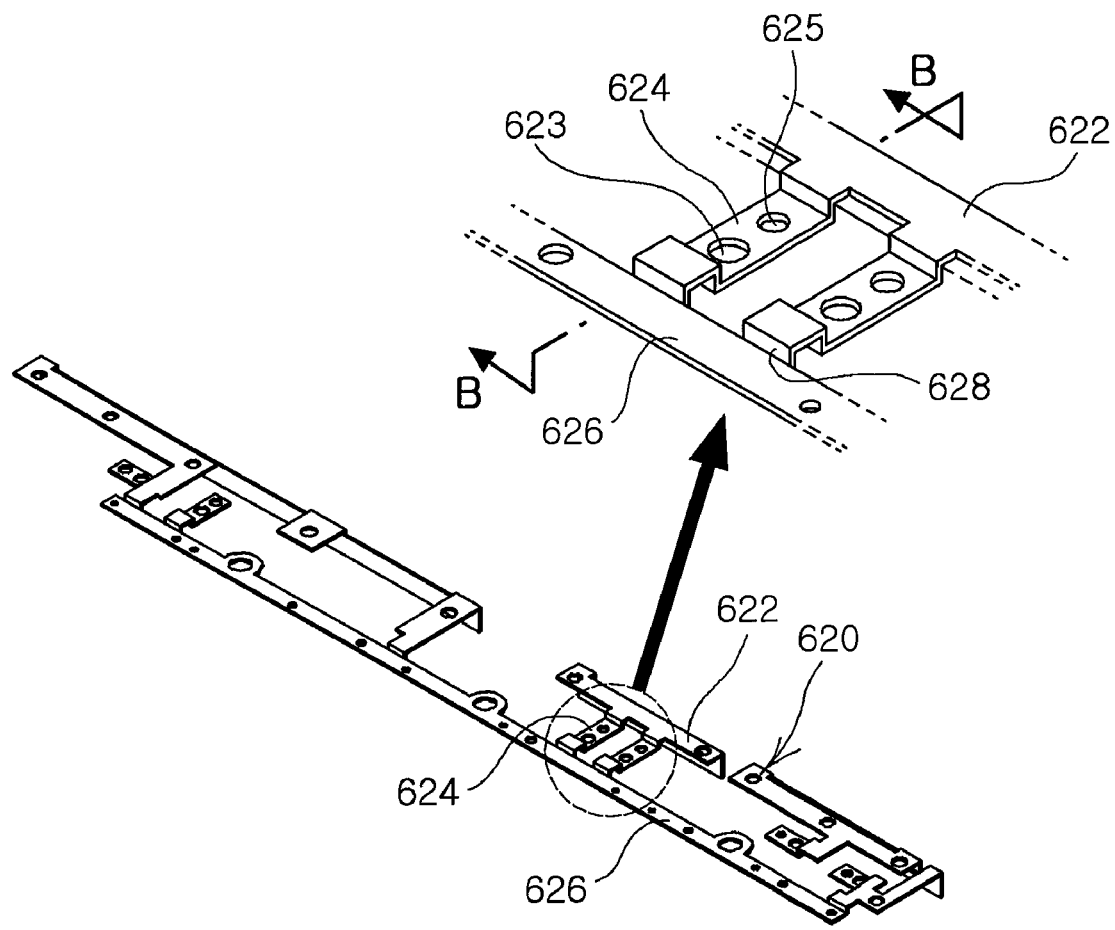
FIG. 21 is a schematic perspective view illustrating an antenna pattern radiator having a ground portion according to another exemplary embodiment of the present invention.

FIG. 20 is a schematic perspective view illustrating an antenna pattern frame having a ground portion according to another exemplary embodiment of the invention. FIG. 21 is a schematic view illustrating an antenna pattern radiator having a ground portion according to another exemplary embodiment of the invention.

An antenna pattern frame 600 having a ground portion according to another exemplary embodiment of the invention may be widely used for a laptop computer requiring noise reduction among electronic devices having antenna patterns embedded in a case.

The antenna pattern frame 600 having a ground portion according to another exemplary embodiment of the invention may include a radiator 620, a ground portion 626 and a radiator frame 610.

The antenna pattern frame 600 according to this embodiment is different from the antenna pattern frame 200, shown in FIGS. 2 through 7, in that the ground portion 626 extends from the radiator 620. The radiator frame 610 may be modified in order to form the ground portion 626.

The ground portion 626 may be supported by a ground portion support 612 that is stepped with respect to the radiator frame 610.

The antenna pattern portion 622 may be formed on one side 610a of the radiator frame 610 or connection terminal portions 624 may be formed on the other side 610b opposite to the one side 610a.

The radiator frame 610 may be configured so that the antenna pattern portion 622 is embedded in the electronic device case.

Like the antenna pattern frame 200, shown in FIGS. 2 through 7, the radiator 620 of the antenna pattern frame 600 may include the connection terminal portions 624 that are formed on the other side 610b of the radiator frame 610 so as to transmit the external signal to the circuit board.

Furthermore, the radiator 620 is bent to form connection portions 628, which are then bent to form the ground portion 626. The ground portions 626 may be formed through the radiator frame 610. As the connection portions 628 are formed through the radiator frame 610, the radiator 620 can be firmly fixed to the radiator frame 610.

Further, contact pin holes 623 that prevent the movement of the radiator 620 inside a mold 700 may be formed in the radiator 620.

Contact pins 728 of the mold 700 may be inserted into the contact pin holes 623 during injection molding to thereby prevent the movement of the radiator 620 inside the mold 700.

Guide pin holes 625 may be formed in the radiator 620. Guide pins 726 of the mold 700 may be inserted into the guide pin holes 625 during injection molding to thereby prevent the movement of the radiator 620 inside the mold 700.

Figure 22:
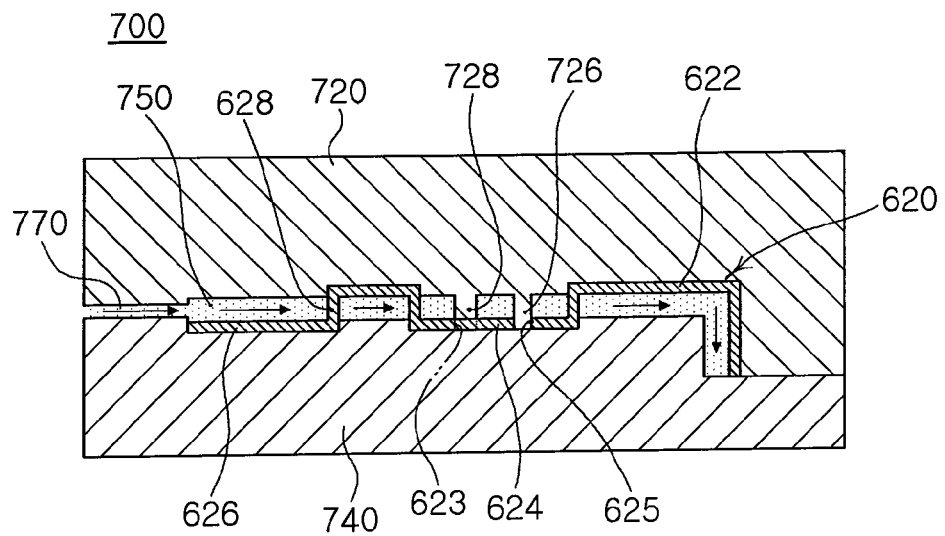
FIG. 22 is a schematic sectional view illustrating a mold for manufacturing an antenna pattern frame that is used to perform a method of manufacturing an antenna pattern frame having a ground portion according to another exemplary embodiment of the present invention.

FIG. 22 is a schematic sectional view illustrating a mold for manufacturing an antenna pattern frame that is used to perform a method of manufacturing an antenna pattern frame having a ground portion according to another exemplary embodiment.

According to the method of manufacturing an antenna pattern frame having a ground portion according to another exemplary embodiment of the invention, first, the radiator 620 may be provided in which the antenna pattern portion 622 receiving the external signal and the ground portion 626 may be arranged in the different planes.

The radiator 620 may be placed in the mold 700 that has an inner space 750 receiving the radiator 620.

After the radiator 620 is arranged in the mold 700, a resin material is injected into the inner space 750 through the resin material injection portion 770, formed in the mold 700, so that the resin material filling the inner space 750 forms the radiator frame 610 that allows the radiator 620 to be embedded in the electronic device case.

When the radiator 620 is arranged in the mold 700, the guide pins 726, the contact pins 728 or the guide pins 726 and the contact pins 728 formed on the mold 700 may be inserted into or make contact with the guide pin holes 625, the contact pin holes 623, or the guide pin holes 625 and the contact pin holes 623 formed in the radiator 620.

Recesses may be formed in the inner space 750 so as to receive the connection terminal portions 624 therein. Injection molding may be performed by arranging the connection terminal portions 624 in the recesses.

The mold 700 for manufacturing the antenna pattern frame having the ground portion according to another exemplary embodiment of the invention may include an upper mold 720 or a lower mold 740 and the resin material injection portion 770. The upper or lower molds 720 or 740 receives the radiator 620 having the antenna pattern portion 622 receiving an external signal and the ground portion 626 while the antenna pattern portion 622 and the ground portion 626 are arranged in the different planes. The resin material injection portion 770 is formed in the upper mold 720, the lower mold 740, or the upper and lower molds 720 and 740. A resin material is injected into the inner space 750 through the resin material injection portion 770 so that the resin material filling the inner space 750 forms the antenna pattern frame 600 that allows the radiator 620 to be embedded in the electronic device case.

Furthermore, the guide pins 726, the contact pins 728 or the guide pins 726 and the contact pins 728 may be formed in the upper or lower mold 720 or 740 and be inserted into the guide pine holes 625, the contact pin holes 623, or the guide pin holes 625 and the contact pin holes 623 formed in the radiator frame 610.

The connection terminal portions 624 may be received in the upper mold 720, the lower mold 740, or the upper and lower molds 720 and 740.

Figure 23:
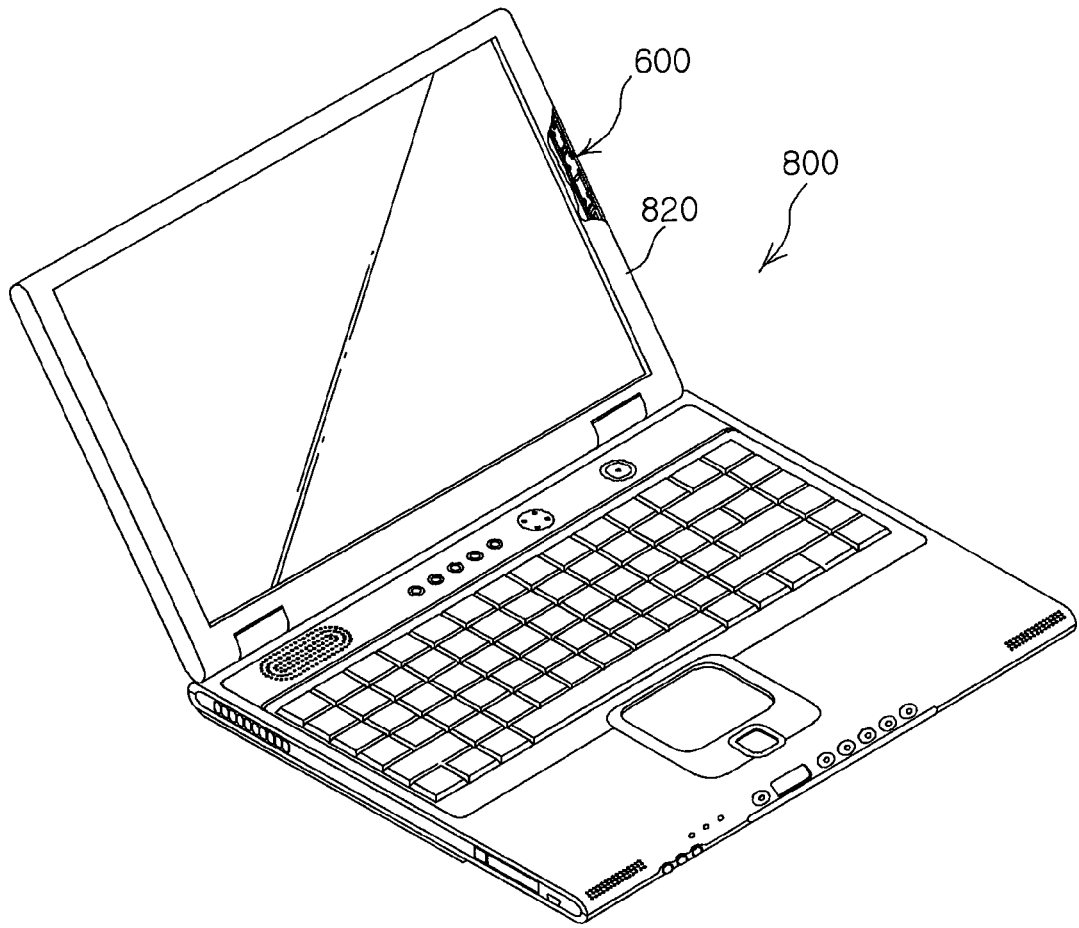
FIG. 23 is a schematic exploded perspective view illustrating a laptop computer that is an electronic device to which an antenna pattern frame having a ground portion is applied according to another exemplary embodiment of the present invention.

FIG. 23 is a schematic exploded perspective view illustrating a laptop computer that is an electronic device to which an antenna pattern frame having a ground portion according to another exemplary embodiment to the invention is applied.

As for the radiator frame 610 having the antenna pattern portion 622, the connection terminal portions 624, and the ground portion 626, the antenna pattern portion 622 may be embedded in a case of a laptop computer, which is an electronic device 800.

That is, the electronic device 800 according to this embodiment may include the radiator frame 610, a case 820 and a circuit board 600.

As for the radiator frame 610, all of the above-described embodiments and manufacturing methods thereof may be applied.

Therefore, the above description will substitute for a detailed description of the electronic device 800.

As set forth above, according to an antenna pattern frame and a method and mold for manufacturing the same according to an exemplary embodiment of the invention, a radiator having an antenna pattern portion can be embedded in an electronic device case, thereby reducing the vulnerability of an external antenna according to the related art to external shocks and preventing an increase in the volume of an internal antenna.

Furthermore, since an antenna of flexible materials can be embedded in the electronic device case, the durability and performance of the antenna can be improved in comparison with the use of the adhesive.

Furthermore, since the antenna can be embedded in the electronic device case without using a protective film, the case can be formed into a three-dimensional shape, such as a curved surface, thereby diversifying the appearance thereof.

Moreover, since an antenna film is not used, a manufacturing process can be performed with ease, and manufacturing costs can be reduced.

In addition, since the radiator and the connection terminal portions can be firmly supported against the antenna pattern frame, the loosening of the antenna pattern portion from a frame can be prevented, and the antenna pattern portion can be firmly connected to the circuit board of the electronic device.

Furthermore, since this antenna pattern frame can be applied to any kind of electronic devices requiring antennas, various applications of the antenna pattern frame can be made.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna pattern frame comprising:
a radiator having an antenna pattern portion transmitting and receiving a signal and a connection terminal portion allowing the signal to be transmitted to and received from a circuit board of an electronic device;
a connection portion partially forming the radiator and connecting the antenna pattern portion and the connection terminal portion to be arranged in different planes;
a radiator frame manufactured by injection molding on the radiator so that the antenna pattern portion is provided on one side of the radiator frame and the connection terminal portion is provided on the other side thereof, while the antenna pattern portion is embedded in the electronic device case; and
a contact surface extension provided on the radiator to prevent the radiator from being loosened from the radiator frame during injection molding of the radiator frame, and increasing a contact area with respect to the radiator frame.

2. The antenna pattern frame of claim 1, wherein the contact surface extension extends from an edge of the radiator, is bent, and is embedded into the radiator frame.

3. The antenna pattern frame of claim 1, wherein the contact surface extension is provided by forming a hole in a surface of the radiator.

4. The antenna pattern frame of claim 1, wherein the contact surface extension is embossed into a surface of the radiator.

5. The antenna pattern frame of claim 1, wherein the contact surface extension is provided by bending a corner of the antenna pattern portion downward and is embedded into the radiator frame.

6. The antenna pattern frame of claim 1, wherein the connection portion is provided by bending the radiator, and the connection terminal portion is then provided by bending the connection portion.

7. The antenna pattern frame of claim 6, wherein the connection terminal portion is supported in contact with a radiator support portion protruding from the other side opposite to the one side of the radiator frame.

8. The antenna pattern frame of claim 6, wherein the connection portion is provided through a radiator support portion protruding from the other side opposite to the one side of the radiator frame.

9. The antenna pattern frame of claim 1, wherein a guide pin hole is provided in the radiator so that a guide pin of a mold is inserted into the guide pin hole during injection molding to thereby prevent a movement of the radiator on the radiator frame.

10. The antenna pattern frame of claim 1, wherein a contact pin hole is provided in the radiator so that a contact pin of a mold is inserted into the contact pin hole during injection molding to thereby prevent a movement of the radiator on the radiator frame.

11. The antenna pattern frame of claim 1, wherein the antenna pattern portion has a curvature, and
the radiator frame has a curved portion so that the antenna pattern portion having the curvature is provided on a surface thereof.

12. A method of manufacturing an antenna pattern frame, the method comprising:
forming a contact surface extension on a radiator to increase a contact area with respect to a resin material during injection molding, the radiator having an antenna pattern portion transmitting and receiving a signal, a connection terminal portion making contact with a circuit board of an electronic device, and a connection portion connecting the antenna pattern portion and the connection terminal portion to be arranged in different planes;
arranging the radiator having the contact surface extension formed thereon in a space inside an upper or lower mold; and
injecting a resin material in the space so that the space inside the upper or low mold forms a radiator frame allowing the antenna pattern portion to be embedded in the electronic device case.

13. The method of claim 12, wherein a guide pin, a contact pin or a guide pin and a contact pin, formed in the upper or lower mold, are inserted into or make contact with a guide pin hole, a contact pin hole or a guide pin hole and a contact pin hole formed in the radiator when the upper and lower molds are joined.

14. The method of claim 12, wherein the contact surface extension extends from an edge of the radiator, is bent, and is embedded into the radiator frame by injection molding.

15. The method of claim 12, wherein the contact surface extension is provided by forming a hole in a surface of the radiator, through which the resin material being injected fills the space.

16. The method of claim 12, wherein the contact surface extension is embossed into a surface of the radiator to increase the contact area with respect to the resin material being injected.

17. The method of claim 12, wherein the contact surface extension is provided by bending a corner of the antenna pattern portion downward and is embedded into the radiator frame manufactured by injecting molding using the resin material.

18. The method of claim 12, wherein the injection molding is performed such that the antenna pattern portion is arranged in contact with one surface of one of the upper and lower molds, and the connection terminal portion is arranged in contact with one surface of the other mold.

* * * * *